United States Patent
Shirai et al.

(10) Patent No.: US 6,650,235 B2
(45) Date of Patent: Nov. 18, 2003

(54) METHOD AND APPARATUS FOR RECOGNIZING OBJECT

(75) Inventors: Noriaki Shirai, Kariya (JP); Yoshie Samukawa, Kariya (JP); Keiji Matsuoka, Kariya (JP)

(73) Assignee: Denso Corporation, Kariya (JP)

( * ) Notice: Subject to any disclaimer, the term of this patent is extended or adjusted under 35 U.S.C. 154(b) by 209 days.

(21) Appl. No.: 09/892,499

(22) Filed: Jun. 28, 2001

(65) Prior Publication Data

US 2001/0052844 A1 Dec. 20, 2001

(30) Foreign Application Priority Data

Jul. 10, 2000 (JP) .......................................... 2000-208559

(51) Int. Cl.$^7$ ................................................ B60Q 1/00
(52) U.S. Cl. ........................ 340/435; 340/436; 340/903; 701/301; 342/70; 342/54; 356/4.01; 356/21; 359/196
(58) Field of Search ............................... 340/435, 436, 340/901, 903, 904, 933, 942; 701/301; 342/70, 54, 118, 71, 72; 356/342, 4.01, 4.02–4.1, 20, 21, 72; 359/196, 197, 204

(56) References Cited

U.S. PATENT DOCUMENTS

| 4,717,252 A | * | 1/1988 | Halldorsson et al. ...... 356/5.01 |
| 4,950,075 A | * | 8/1990 | Ichinose et al. .......... 356/141.1 |
| 5,914,776 A | * | 6/1999 | Streicher .................... 356/5.01 |
| 5,970,433 A | * | 10/1999 | Oka et al. .................... 702/159 |
| 6,246,502 B1 | * | 6/2001 | Okada et al. ............... 359/196 |

* cited by examiner

*Primary Examiner*—Nina Tong
(74) *Attorney, Agent, or Firm*—Posz & Bethards, PLC

(57) ABSTRACT

A transmission wave is applied to a predetermined range in a width-wise direction of a subject vehicle. Objects located ahead of the subject vehicle are recognized on the basis of reflected waves which result from reflections of the transmission wave. The reflected waves are converted into a received signal. Detection is made regarding a variation in an intensity of the received signal along a direction corresponding to the width-wise direction of the subject vehicle. The received signal is separated into a first signal portion and a second signal portion on the basis of the detected signal intensity variation. The first signal portion corresponds to a scattered portion of the transmission wave. The second signal portion corresponds to an unscattered portion of the transmission wave. Objects are recognized on the basis of the second signal portion.

24 Claims, 10 Drawing Sheets

LASER RADAR DETECTION AREA

METHOD AND APPARATUS FOR RECOGNIZING OBJECT

BACKGROUND OF THE INVENTION

1. Field of the Invention

This invention relates to a method of recognizing an object.

In addition, this invention relates to an apparatus for recognizing an object which can be mounted on a vehicle. Furthermore, this invention relates to a recording medium storing a computer program for recognizing an object.

2. Description of the Related Art

A known object recognition apparatus for a vehicle emits a forward wave beam such as a light beam or a millimeter wave beam from the body of the vehicle, and enables the forward wave beam to scan a given angular region in front of the body of the vehicle. In the case where an object exists in the given angular region, the forward wave beam encounters the object before being at least partially reflected thereby. A portion of the reflected wave beam returns to the apparatus as an echo wave beam. The apparatus detects and recognizes the object in response to the echo wave beam.

The known object recognition apparatus is used in a warning system for a vehicle which alarms when an obstacle such as a preceding vehicle exists in a given angular region in front of the present vehicle. The known object recognition apparatus is used also in a system for a vehicle which controls the speed of the vehicle to maintain a proper distance between the vehicle and a preceding vehicle.

It is known to use a laser beam as a forward wave beam in an object recognition apparatus for a vehicle. In general, the front end of such an object recognition apparatus has a transparent member through which the forward laser beam travels. A waterdrop encounters the transparent member, changing into a lens-like shape thereon. In some cases, the forward laser beam is scattered when traveling through the lens-like shape of water on the transparent member. The scatter increases the cross-sectional area of the forward laser beam. An increase in the cross-sectional area of the forward laser beam reduces the resolution of detection of an object position and the accuracy of detection of an object size.

In general, a given angular region (a given object detectable area or a given detection area) in front of the body of the vehicle is scanned by the forward laser beam while the angular direction of the forward laser beam is sequentially changed among ones separated at equal unit angles. According to an example, in the absence of a lens-like shape of water from a surface of the transparent member, there occur detected echo beams for 5 successive angular directions of the forward laser beam. On the other hand, in the presence of a lens-like shape of water on the surface of the transparent member, there occur detected echo beams for 10 successive angular directions of the forward laser beam. In this case, a detected width of an object is equal to twice the actual width thereof.

The previously-mentioned scatter sometimes causes the forward laser beam to travel out of the detection area in front of the body of the vehicle. When such a forward laser beam encounters an object outside the detection area and is reflected thereby, an echo beam may return to the object recognition apparatus. On the basis of this echo beam, the apparatus erroneously recognizes the object outside the detection area as an object therein.

A member having a slit is used to narrow and make the cross section of a forward laser beam into an ideal shape. Diffraction at the slit causes an increased intensity of light in a peripheral portion of the beam, so that the shape of the cross section of the beam deviates from the ideal one. Therefore, the theoretical shape of the cross section of the forward laser beam which is used in an object recognition apparatus differs from the actual shape thereof. The difference between the theoretical shape and the actual shape causes a decrease in accuracy of object recognition by the apparatus.

Japanese patent application publication number P2000-180532A discloses a method of detecting an object position which is used in a scanning-type radar for a vehicle. The radar emits a millimeter wave beam. The method in Japanese application P2000-180532A is designed to implement the following process. In the case where there are a plurality of peaks of the power of a reflected beam and a plurality of mountains formed by the plurality of peaks, and where reflection due to a side lobe is included in the power of the reflected beam, a threshold is set to remove the power of the reflection due to the side lobe so that an angle at a widthwise center in angles defined by peaks of both ends among the remaining peaks is detected as a center position of an object.

U.S. Pat. No. 5,627,511 (corresponding to Japanese patent application publication number 8-122437) discloses a distance measuring apparatus for an automotive vehicle that compensates for the influence of particles floating in the air.

The apparatus of U.S. Pat. No. 5,627,511 outputs laser pulse signals at given angular intervals over an object detectable zone, and receives a signal produced by reflection of one of the outputted signals from a reflective object to determine the distance to the object. The apparatus has the function of determining a type of the object present in the object detectable zone. In the case where there are a plurality of signals produced by dispersion of a single shot of the laser pulse signals, and where distances derived by signals reflected from most of the object detectable zone show given shorter distance values, the object present in the object detectable zone is identified as a particle such as snow or fog floating in the air.

U.S. Pat. No. 4,699,507 (corresponding to Japanese patent application publication number 60-201276) discloses an apparatus and method for measuring the distance to a desired light-reflecting object. The apparatus and method in U.S. Pat. No. 4,699,507 are capable of recognizing erroneous measurements due to the presence of light-reflecting particles suspended in the air. The range of intensity of reflected light achievable by air-borne particles is previously stored. When the actual intensity of reflected light falls within the above-indicated range, the outputting of the measured distance to the light-reflecting object is inhibited.

U.S. Pat. No. 5,805,527 (corresponding to Japanese patent application publication number 9-236661) discloses a distance measuring apparatus which includes a wave transmitting device for emitting a transmission wave. The apparatus in U.S. Pat. No. 5,805,527 also includes a wave receiving device for receiving a reflection wave, which results from reflection of the transmission wave by a reflection object, as a reception wave. A time difference measuring device is operative for measuring a time difference between a moment at which the wave transmitting device emits the transmission wave and a moment at which the wave receiving device receives the reception wave. A distance calculating device is operative for calculating a distance to the reflection object on the basis of the time difference calculated by the time difference measuring device. An error correcting device is operative for detecting a time interval during which a signal level of the reception wave remains higher than a predetermined threshold level, and for correcting an error in the calculated distance to the reflection object on the basis of the detected time interval, the error being caused by a difference in intensity of the reception wave.

SUMMARY OF THE INVENTION

It is a first object of this invention to provide a method of accurately recognizing an object.

It is a second object of this invention to provide an apparatus for accurately recognizing an object.

It is a third object of this invention to provide a recording medium storing a computer program for accurately recognizing an object.

A first aspect of this invention provides a method of applying a transmission wave to a predetermined range in a width-wise direction of a subject vehicle, and recognizing objects located ahead of the subject vehicle on the basis of reflected waves which result from reflections of the transmission wave. The method comprises the steps of converting the reflected waves into a received signal; detecting a variation in an intensity of the received signal along a direction corresponding to the width-wise direction of the subject vehicle; separating the received signal into a first signal portion and a second signal portion on the basis of the detected signal intensity variation, the first signal portion corresponding to a scattered portion of the transmission wave, the second signal portion corresponding to an unscattered portion of the transmission wave; and recognizing objects on the basis of the second signal portion.

A second aspect of this invention provides an object recognition apparatus comprising radar means for applying a transmission wave to a predetermined range in a width-wise direction of a subject vehicle, converting reflected waves, which result from reflections of the transmission wave, into a received signal, and detecting objects on the basis of the received signal; and recognizing means for recognizing objects located ahead of the subject vehicle on the basis of results of detection by the radar means. The recognizing means comprises 1) means for detecting a variation in an intensity of the received signal along a direction corresponding to the width-wise direction of the subject vehicle; 2) means for separating the received signal into a first signal portion and a second signal portion on the basis of the detected signal intensity variation, the first signal portion corresponding to a scattered portion of the transmission wave, the second signal portion corresponding to an unscattered portion of the transmission wave; and 3) means for recognizing objects on the basis of the second signal portion.

A third aspect of this invention is based on the second aspect thereof, and provides an object recognition apparatus wherein the recognizing means comprises means for detecting the intensity of the received signal, and means for executing the separation of the received signal into the first signal portion and the second signal portion on the basis of the detected signal intensity.

A fourth aspect of this invention is based on the third aspect thereof, and provides an object recognition apparatus wherein the recognizing means comprises means for setting a threshold value equal to a peak value of the detected signal intensity minus a predetermined value, means for determining whether or not the detected intensity of the received signal is lower than the threshold value, and means for executing the separation of the received signal into the first signal portion and the second signal portion in response to a result of determining whether or not the detected intensity of the received signal is lower than the threshold value.

A fifth aspect of this invention is based on the second aspect thereof, and provides an object recognition apparatus wherein the recognizing means comprises means for calculating a rate of the detected signal intensity variation, and means for executing the separation of the received signal into the first signal portion and the second signal portion in response to the calculated intensity variation rate.

A sixth aspect of this invention is based on the fifth aspect thereof, and provides an object recognition apparatus wherein the recognizing means comprises means for setting a threshold value with respect to the calculated intensity variation rate corresponding to a predetermined steep state, means for determining whether or not the intensity of the received signal is lower than the threshold value, and means for executing the separation of the received signal into the first signal portion and the second signal portion in response to a result of determining whether or not the intensity of the received signal is lower than the threshold value.

A seventh aspect of this invention is based on the fifth aspect thereof, and provides an object recognition apparatus wherein the recognizing means comprises means for, when the calculated intensity variation rate corresponds to a predetermined gentle and monotonically-changing state, judging that a corresponding recognized object exists outside a predetermined recognition area.

An eighth aspect of this invention is based on the fifth aspect thereof, and provides an object recognition apparatus wherein the recognizing means comprises means for, when the calculated intensity variation rate corresponds to a predetermined gentle and monotonically-changing state occurring in a prescribed vehicle width-wise direction position, judging that a corresponding recognized object exists outside a predetermined recognition area.

A ninth aspect of this invention is based on the fifth aspect thereof, and provides an object recognition apparatus wherein the recognizing means comprises means for calculating a straight line approximate to the rate of the detected signal intensity variation in a least-squares method, means for calculating a slope of the straight line, and means for calculating the rate of the detected signal intensity variation from the calculated slope of the straight line.

A tenth aspect of this invention is based on the second aspect thereof, and provides an object recognition apparatus wherein the recognizing means comprises means for setting a threshold value with respect to the intensity of the received signal, means for using the threshold value in the separation of the received signal into the first signal portion and the second signal portion, and means for changing the threshold value on the basis of a size of a recognized object.

An eleventh aspect of this invention is based on the tenth aspect thereof, and provides an object recognition apparatus wherein the recognizing means comprises means for continuing the changing of the threshold value until a length of the recognized object in the width-wise direction of the subject vehicle falls into a predetermined range.

A twelfth aspect of this invention is based on the second aspect thereof, and provides an object recognition apparatus wherein the received signal contains a pulse, and a time difference between a leading edge and a trailing edge of the pulse increases as the intensity of the received signal rises, and wherein the recognizing means comprises means for estimating the intensity of the received signal on the basis of the time difference between the leading edge and the trailing edge of the pulse.

A thirteenth aspect of this invention is based on the second aspect thereof, and provides an object recognition apparatus wherein the recognizing means comprises condition estimating means for estimating whether or not there occurs a scatter condition that the transmission wave can be scattered, means for, only when the condition estimating means estimates that there occurs the scatter condition, executing the separation of the received signal into the first signal portion and the second signal portion.

A fourteenth aspect of this invention is based on the thirteenth aspect thereof, and provides an object recognition apparatus wherein the scatter condition comprises a condition that a waterdrop can meet a member of the radar means through which the transmission wave travels.

A fifteenth aspect of this invention is based on the fourteenth aspect thereof, and provides an object recognition apparatus wherein the condition estimating means comprises means for estimating whether or not there occurs the scatter condition on the basis of whether or not a windshield wiper of the subject vehicle is active.

A sixteenth aspect of this invention provides a recording medium storing a program for controlling a computer operating as the recognizing means in the object recognition apparatus of the second aspect of this invention.

A seventeenth aspect of this invention provides a method of applying a transmission wave to a predetermined range in a width-wise direction of a subject vehicle, and recognizing objects located ahead of the subject vehicle on the basis of reflected waves which result from reflections of the transmission wave. The method comprises the steps of converting the reflected waves into a received signal; wherein an intensity of a part of the transmission wave is maximized at a transmission center point, and is decreased as the part of the transmission wave becomes more distant from the transmission center point as viewed along the width-wise direction of the subject vehicle, and wherein a portion of the transmission wave which has an intensity equal to or higher than a prescribed intensity is effective for object recognition; detecting a rate of a variation in an intensity of the received signal along a direction corresponding to the width-wise direction of the subject vehicle; separating the received signal into a first signal portion and a second signal portion on the basis of the detected intensity variation rate, the first signal portion corresponding to the portion of the transmission wave which has the intensity equal to or higher than the prescribed intensity, the second signal portion corresponding to another portion of the transmission wave; and recognizing objects on the basis of the first signal portion.

An eighteenth aspect of this invention provides a method of applying a transmission wave to a predetermined range in a width-wise direction of a subject vehicle, and recognizing objects located ahead of the subject vehicle on the basis of reflected waves which result from reflections of the transmission wave. The method comprises the steps of converting the reflected waves into a received signal; wherein an intensity of a part of the transmission wave is maximized at a transmission center point, and is decreased as the part of the transmission wave becomes more distant from the transmission center point as viewed along the width-wise direction of the subject vehicle, and wherein a portion of the transmission wave which has an intensity equal to or higher than a prescribed intensity is effective for object recognition; setting a threshold value with respect to an intensity of the received signal; separating the received signal into a first signal portion and a second signal portion on the basis of the threshold value, the first signal portion corresponding to the portion of the transmission wave which has the intensity equal to or higher than the prescribed intensity, the second signal portion corresponding to another portion of the transmission wave; recognizing objects on the basis of the first signal portion; and changing the threshold value until a length of a recognized object in the width-wise direction of the subject vehicle falls into a predetermined range.

A nineteenth aspect of this invention provides an object recognition apparatus comprising radar means for applying a transmission wave to a predetermined range in a width-wise direction of a subject vehicle, converting reflected waves, which result from reflections of the transmission wave, into a received signal, and detecting objects on the basis of the received signal; and recognizing means for recognizing objects located ahead of the subject vehicle on the basis of results of detection by the radar means; wherein an intensity of a part of the transmission wave is maximized at a transmission center point, and is decreased as the part of the transmission wave becomes more distant from the transmission center point as viewed along the width-wise direction of the subject vehicle, and wherein a portion of the transmission wave which has an intensity equal to or higher than a prescribed intensity is effective for object recognition. The recognizing means comprises 1) means for detecting a rate of a variation in an intensity of the received signal along a direction corresponding to the width-wise direction of the subject vehicle; 2) means for separating the received signal into a first signal portion and a second signal portion on the basis of the detected intensity variation rate, the first signal portion corresponding to the portion of the transmission wave which has the intensity equal to or higher than the prescribed intensity, the second signal portion corresponding to another portion of the transmission wave; and 3) means for recognizing objects on the basis of the first signal portion.

A twentieth aspect of this invention is based on the nineteenth aspect thereof, and provides an object recognition apparatus wherein the recognizing means comprises means for setting a threshold value with respect to the calculated intensity variation rate corresponding to a predetermined steep state, means for determining whether or not the intensity of the received signal is lower than the threshold value, and means for executing the separation of the received signal into the first signal portion and the second signal portion in response to a result of determining whether or not the intensity of the received signal is lower than the threshold value.

A twenty-first aspect of this invention is based on the nineteenth aspect thereof, and provides an object recognition apparatus wherein the recognizing means comprises means for, when the calculated intensity variation rate corresponds to a predetermined gentle and monotonically-changing state, judging that a corresponding recognized object exists outside a predetermined recognition area.

A twenty-second aspect of this invention is based on the nineteenth aspect thereof, and provides an object recognition apparatus wherein the recognizing means comprises means for, when the calculated intensity variation rate corresponds to a predetermined gentle and monotonically-changing state occurring in a prescribed vehicle width-wise direction position, judging that a corresponding recognized object exists outside a predetermined recognition area.

A twenty-third aspect of this invention is based on the nineteenth aspect thereof, and provides an object recognition apparatus wherein the recognizing means comprises means for calculating a straight line approximate to the rate of the detected signal intensity variation in a least-squares method, means for calculating a slope of the straight line, and means for calculating the rate of the detected signal intensity variation from the calculated slope of the straight line.

A twenty-fourth aspect of this invention provides an object recognition apparatus comprising radar means for applying a transmission wave to a predetermined range in a width-wise direction of a subject vehicle, converting reflected waves, which result from reflections of the transmission wave, into a received signal, and detecting objects on the basis of the received signal; and recognizing means for recognizing objects located ahead of the subject vehicle on the basis of results of detection by the radar means; wherein an intensity of a part of the transmission wave is maximized at a transmission center point, and is decreased as the part of the transmission wave becomes more distant from the transmission center point as viewed along the width-wise direction of the subject vehicle, and wherein a portion of the transmission wave which has an intensity equal to or higher than a prescribed intensity is effective for object recognition. The recognizing means comprises 1) means for setting a threshold value with respect to an intensity of the received signal; 2) means for separating the received signal into a first signal portion and a second signal portion on the basis of the threshold value, the first signal portion corresponding to the portion of the transmission wave which has the intensity equal to or higher than the prescribed intensity, the second signal portion corresponding to another portion of the transmission wave; 3) means for recognizing objects on the basis of the first signal portion; and 4) means for changing the threshold value until a length of a recognized object in the width-wise direction of the subject vehicle falls into a predetermined range.

DETAILED DESCRIPTION OF THE INVENTION

First Embodiment

Figure 1:
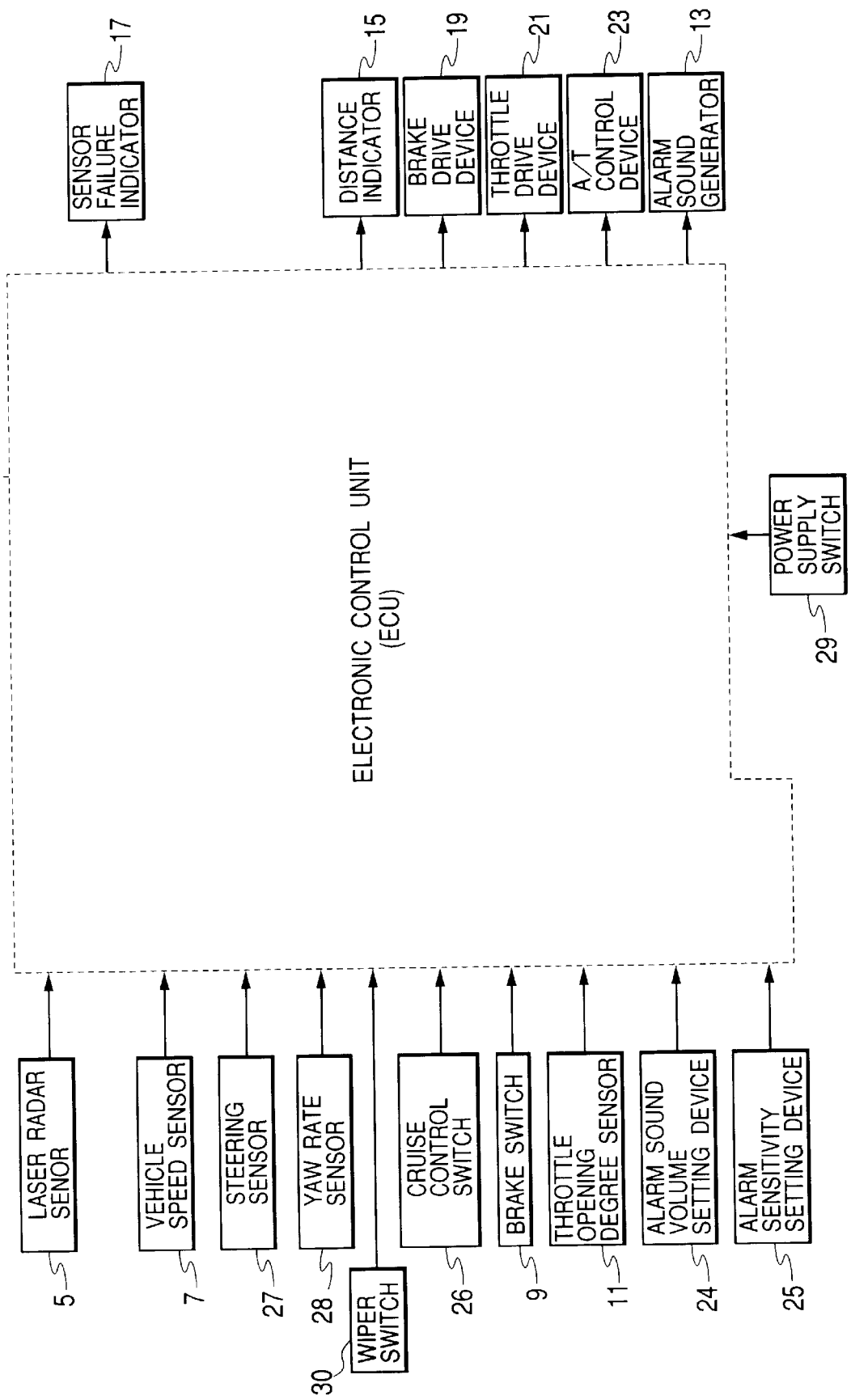
FIG. 1 is a block diagram of a vehicle control apparatus according to a first embodiment of this invention.

FIG. 1 shows a vehicle control apparatus according to a first embodiment of this invention. The vehicle control apparatus is mounted on a vehicle which will be referred to as the present vehicle or the subject vehicle. The vehicle control apparatus alarms when an obstacle in a specified condition exists in a given angular region (a given detection area) in front of the present vehicle. The vehicle control apparatus adjusts the speed of the present vehicle in accordance with the speed of a preceding vehicle. The vehicle control apparatus includes a recording medium.

As shown in FIG. 1, the vehicle control apparatus includes an electronic control unit (ECU) 3 having a computer such as a microcomputer. The computer in the ECU 3 has a combination of an input/output (I/O) interface, a CPU, a ROM, and a RAM. The ECU 3 (the computer therein) operates in accordance with a program stored in the ROM. The program may be stored in the RAM. In this case, the RAM is provided with a backup device.

Alternatively, the program may be stored in a recording medium such as a floppy disk, a magneto-optical disk, a CD-ROM, a DVD-ROM, or a hard disk. In this case, the ECU 3 is connected with a drive for the recording medium, and the program is downloaded into the computer of the ECU 3 through the drive.

The vehicle control apparatus includes a laser radar sensor 5, a vehicle speed sensor 7, a brake switch 9, and a throttle opening degree sensor (a throttle position sensor) 11 which are connected to the ECU 3. The output signals of the devices 5, 7, 9, and 11 are inputted into the ECU 3.

The vehicle control apparatus includes an alarm sound generator 13, a distance indicator 15, a sensor failure indicator 17, a brake drive device 19, a throttle drive device 21, and an automotive automatic transmission control device 23 which are connected to the ECU 3. The ECU 3 outputs drive signals to the devices 13, 15, 17, 19, 21, and 23.

The vehicle control apparatus includes an alarm sound volume setting device 24, an alarm sensitivity setting device 25, a cruise control switch 26, a steering sensor 27, a yaw rate sensor 28, and a windshield wiper switch 30 which are connected to the ECU 3. The output signals of the devices 24, 25, 26, 27, 28, and 30 are inputted into the ECU 3. The alarm sound volume setting device 24 acts to set the volume of alarm sound. The alarm sensitivity setting device 25 acts to set the sensitivity in a warning determination process mentioned later.

The vehicle control apparatus includes a power supply switch 29 connected to the ECU 3. When the power supply switch 29 is changed to its on position, the ECU 3 is powered and starts predetermined processes.

Figure 2:
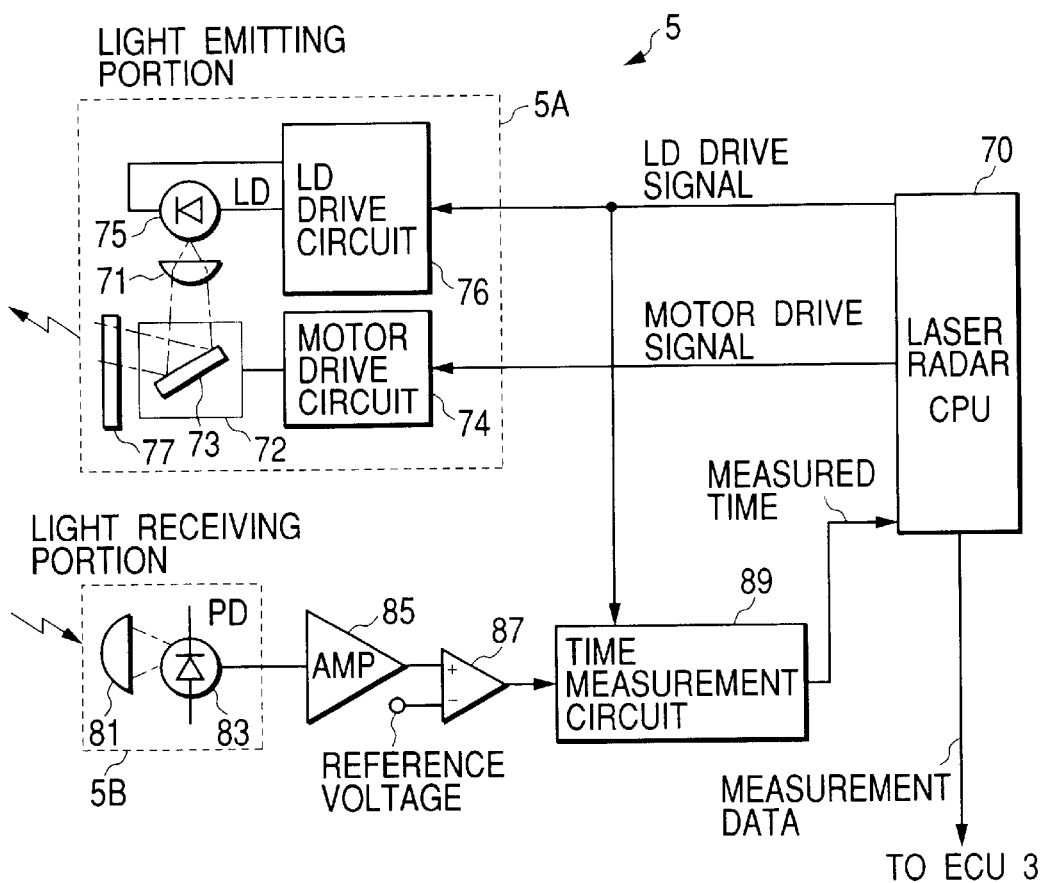
FIG. 2 is a diagram of a laser radar sensor in FIG. 1.

As shown in FIG. 2, the laser radar sensor 5 contains a light emitting portion 5A, a light receiving portion 5B, and a CPU 70.

The CPU 70 includes a memory storing a program. The CPU 70 operates in accordance with the program.

The light emitting portion 5A in the laser radar sensor 5 includes a lens 71, a scanner 72, a motor drive circuit 74, a semiconductor laser diode 75, a laser-diode drive circuit 76, and a glass plate 77. The scanner 72 has a mirror 73 and a motor (not shown). The mirror 73 is mechanically connected with the output shaft of the motor. The mirror 73 can be rotated by the motor. The motor is electrically connected to the motor drive circuit 74. The motor drive circuit 74 is connected to the CPU 70. The laser diode 75 is connected to the laser-diode drive circuit 76. The laser-diode drive circuit 76 is connected to the CPU 70.

The laser-diode drive circuit 76 receives a laser-diode drive signal from the CPU 70. The laser-diode drive circuit 76 activates the laser diode 75 in response to the laser-diode drive signal so that the laser diode 75 emits a pulse laser beam. The emitted pulse laser beam travels through the lens 71 before reaching the mirror 73 and being reflected thereby. The reflection-resultant pulse laser beam propagates through the glass plate 77 before being outputted from the light emitting portion 5A as a forward laser beam. In the case where a waterdrop or a raindrop encounters the glass plate 77 and changes into a lens-like shape thereon, the forward laser beam may be scattered while traveling through the lens-like shape of water on the glass plate 77.

The motor drive circuit 74 receives a motor drive signal from the CPU 70. The motor drive circuit 74 activates the motor in response to the motor drive signal so that the motor periodically and cyclically rotates the mirror 73 along clockwise and counterclockwise directions in a predetermined limited angular range. The periodical and cyclical rotation of the mirror 73 causes periodical and cyclical deflection of the forward laser beam, thereby enabling a given angular region in front of the present vehicle to be periodically scanned by the forward laser beam. The given angular region corresponds to a given sectorial detection area monitored by the laser radar sensor 5.

During every scanning period (every frame period), the angular direction of the forward laser beam is changed a unit-angle by a unit-angle. The unit angle corresponds to, for example, 0.15 degrees. The detection area (the given angular region) scanned by the forward laser beam has an angular range of, for example, about 16 degrees which extends in the width-wise direction of the present vehicle as viewed therefrom. In this case, the detection area corresponds to 105 image points or pixels (105 multiplied by 0.15 degrees equals about 16 degrees) composing one frame. The forward laser beams in the respective 105 angular directions are serially numbered from "0" to "104". The forward laser beam numbered "0" is in the leftmost direction corresponding to an angle of about −7.8 degrees. The forward laser beam numbered "104" is in the rightmost direction corresponding to an angle of about +7.8 degrees. These numbers "0" to "104" are referred to as beam order numbers. The 105 image points or pixels composing one frame are identified by the beam order numbers "0" to "104" respectively.

The light receiving portion 5B in the laser radar sensor 5 includes a lens 81 and a light receiving element 83. The light receiving element 83 contains, for example, a photodiode or a photodetector. The light receiving element 83 is connected to an amplifier 85. The amplifier 85 is connected to a comparator 87. The comparator 87 is connected to a time measurement circuit 89. The time measurement circuit 89 is connected to the CPU 70.

In the case where an object exists in the detection area (the given angular region), the forward laser beam encounters the object before being at least partially reflected thereby. A portion of the reflected laser beam returns to the laser radar sensor 5 as an echo laser beam. Specifically, the echo laser beam travels through the lens 81 before being incident to the light receiving element 83. The light receiving element 83 converts the echo laser beam into a corresponding electric signal (referred to as an echo signal). The light receiving element 83 outputs the electric signal to the amplifier 85. The device 85 amplifies the output signal of the light receiving element 83. The amplifier 85 outputs the amplification-resultant signal to the comparator 87. The device 87 compares the output signal of the amplifier 85 with a predetermined reference voltage (a predetermined threshold voltage) Vth, thereby converting the output signal of the amplifier 85 into a binary signal or a pulse signal. The comparator 87 outputs the binary signal (the pulse signal) to the time measurement circuit 89.

The time measurement circuit 89 receives the laser-diode drive signal from the CPU 70. Every pulse in the laser-diode drive signal corresponds to a pulse of the forward laser beam. The time measurement circuit 89 responds to every pulse in the laser-diode drive signal. In the presence of a detected object in the detection area, the output signal of the comparator 87 has a pulse caused by a pulse echo laser beam corresponding to a pulse of the forward laser beam. The width of the pulse in the output signal of the comparator 87 increases as the intensity of the pulse echo laser beam rises or the intensity of the echo signal rises. The time measurement circuit 89 responds to every pulse in the output signal of the comparator 87. Specifically, the time measurement circuit 89 uses every pulse in the laser-diode drive signal as a start pulse PA. The time measurement circuit 89 uses the corresponding pulse in the output signal of the comparator 87 as a stop pulse PB. The time measurement circuit 89 measures the phase difference between the start pulse PA and the stop pulse PB, that is, the time interval or the time difference between the moment of the occurrence of the start pulse PA and the moment of the occurrence of the stop pulse PB. The time measurement circuit 89 generates a digital signal representing the measured phase difference (the measured time interval or difference). The time measurement circuit 89 outputs the time-interval-representing digital signal to the CPU 70. In addition, the time measurement circuit 89 measures the width of the stop pulse PB as an indication of the intensity of the related pulse echo laser beam. The time measurement circuit 89 generates a digital signal representing the measured pulse width (the measured echo intensity). The time measurement circuit 89 outputs the pulse-width-representing digital signal to the CPU 70.

The CPU 70 generates measurement data in response to the time-interval-representing digital signal and the pulsewidth-representing digital signal. The measurement data represents the angle or the angular position "θ" of an object in the detection area, the distance "r" to the object from the present vehicle, and the width of the related pulse in the output signal of the comparator 87 (that is, the intensity of the related echo laser beam or the related echo signal). The CPU 70 outputs the measurement data to the ECU 3.

In general, since the object is greater than the cross-sectional area of the forward laser beam and is scanned thereby, the measurement data corresponding to one forward-laser-beam angular direction relates to a partial object or a point-like part of an object. Objects detected by the laser radar sensor 5 include obstacles with respect to the present vehicle.

Figure 3:
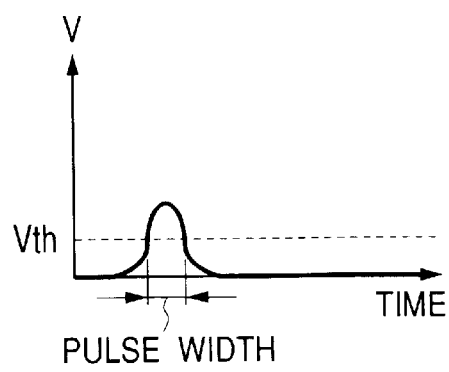
FIG. 3 is a diagram of a first example of the time-domain variation in the voltage of the output signal from an amplifier in FIG. 2.
Figure 4:
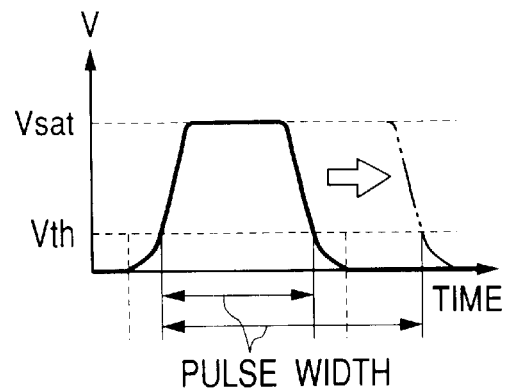
FIG. 4 is a diagram of a second example of the time-domain variation in the voltage of the output signal from the amplifier in FIG. 12.

The amplifier 85 uses a bipolar transistor. The amplifier 85 is saturated when the level of an input signal thereinto exceeds a certain value. FIG. 3 shows an example of a variation in the output signal of the amplifier 85 which occurs while the level of the output signal of the light receiving element 83 (that is, the intensity of the echo laser beam) remains below the certain value. As shown in FIG. 3, the amplifier 85 is not saturated under such a condition. FIG. 4 shows an example of a variation in the output signal of the amplifier 85 which occurs during a time interval including a portion where the level of the output signal of the light receiving element 83 (that is, the intensity of the echo laser beam) increases above the certain value. As shown in FIG. 4, the amplifier 85 is saturated under such a condition. Specifically, the level of the output signal of the amplifier 85 continues to be fixed at a saturation value Vsat while the level of the output signal of the light receiving element 83 remains above the certain value. According to the minority carrier storage effect, the trailing edge of a pulse in the output signal of the light receiving element 83 is delayed as the intensity of an echo laser beam rises (see the two-dot dash curve in FIG. 4). The width of a pulse in the output signal of the comparator 87 corresponds to the time interval during which the voltage of the output signal of the amplifier 85 remains higher than the predetermined reference voltage Vth. The width of a pulse in the output signal of the comparator 87 depends on the intensity of an echo laser beam or an echo signal. Specifically, the width of a pulse is approximately proportional to the logarithm of the intensity of an echo laser beam or an echo signal. Accordingly, it is possible to estimate the intensity of an echo laser beam or an echo signal from the width of a pulse.

The laser beam may be replaced by a radio wave beam, a millimeter wave beam, or an ultrasonic beam. The scanning may be implemented by controlling the echo beam reception by the laser radar sensor 5.

The ECU 3 receives the measurement data from the laser radar sensor 5. The ECU 3 recognizes objects on the basis of the measurement data. The ECU 3 detects a preceding vehicle with respect to the present vehicle on the basis of the result of the object recognition. In addition, the ECU 3 detects conditions of the preceding vehicle. The ECU 3 executes inter-vehicle distance control. During the execution of the inter-vehicle distance control, the ECU 3 generates and outputs suitable drive signals to the brake drive unit 19, the throttle drive device 21, and the automotive automatic transmission control device 23 to adjust the speed of the present vehicle in accordance with the conditions of the preceding vehicle. Simultaneously with the execution of the inter-vehicle distance control, the ECU 3 executes a warning determination process designed to generate an alarm in the case where an obstacle corresponding to a recognized object remains in a specified area during longer than a prescribed time interval. The obstacle corresponds to, for example, a preceding vehicle, a stationary vehicle, a guardrail on a road side, or a prop on a road side.

The vehicle speed sensor 7 is associated with a wheel of the present vehicle. The vehicle speed sensor 7 detects the rotational speed of the vehicle wheel. The vehicle speed sensor 7 outputs a signal to the ECU 3 which represents the detected rotational speed of the vehicle wheel.

The steering sensor 27 detects the degree of operation of a vehicle steering wheel (not shown), that is, the steering angle in the present vehicle. Specifically, the steering sensor 27 detects a quantity of change of the steering angle. The steering sensor 27 outputs a signal to the ECU 3 which represents the detected quantity of change of the steering angle. When the power supply switch 29 is moved to its on position, a variable used in the ECU 3 as an indication of a detected steering angle (radian) is initialized to "0". After the movement of the power supply switch 29 to its on position, the detected steering angle is decided by integrating the quantity of change of the steering angle which is represented by the output signal of the steering sensor 27.

The yaw rate sensor 28 detects the rate Ω (radian/second) of change in the rotational angle (the yaw angle) of the body of the present vehicle about the vertical axis thereof. The yaw rate sensor 28 informs the ECU 3 of the detected yaw rate Ω.

When the cruise control switch 26 is changed to its on position, the ECU 3 operates to start the vehicle cruise control. During the execution of the vehicle cruise control, signal processing for the inter-vehicle distance control can be implemented by the ECU 3. When the ECU 3 determines that the present vehicle is excessively close to an objective preceding vehicle, the alarm sound generator 13 is activated by the ECU 3 to generate alarm sound. The volume of the generated alarm sound is equalized to a level adjustably determined by the alarm sound volume setting device 24. The sensitivity of generation of alarm sound can be adjusted by the alarm sensitivity setting device 25.

The brake switch 9 detects depression of a brake pedal of the present vehicle. The brake switch 9 informs the ECU 3 of the detected brake-pedal depression. The ECU 3 generates a drive signal for the brake drive device 19 in response to information containing the information of the detected brake-pedal depression.

The ECU 3 outputs the generated drive signal to the brake drive device 19. The brake drive device 19 adjusts the braking pressure in response to the drive signal outputted from the ECU 3.

The throttle opening degree sensor 11 detects the degree of opening through a throttle valve in an engine for driving the present vehicle. The throttle opening degree sensor 11 outputs a signal to the ECU 3 which represents the detected throttle opening degree. The ECU 3 controls the throttle drive device 21 in response to the detected throttle opening degree, thereby adjusting the actual degree of opening through the throttle valve and adjusting the power output of the engine.

The ECU 3 determines whether or not the laser radar sensor 5 is operating normally by referring to the output signal therefrom. When the ECU 3 determines that the laser radar sensor 5 is not operating normally, the sensor failure indicator 17 is controlled by the ECU 3 to indicate a failure.

The ECU 3 selects an objective preceding vehicle from among candidate preceding vehicles detected in response to the output signal of the laser radar sensor 5. The ECU 3 calculates the distance to the objective preceding vehicle from the present vehicle. The distance indicator 15 is controlled by the ECU 3 to indicate the calculated distance to the objective preceding vehicle from the present vehicle.

The automotive automatic transmission control device 23 selects a used gear position of an automotive automatic transmission and thereby controls the speed of the present vehicle in response to the output signal from the ECU 3.

A windshield wiper of the present vehicle is activated and deactivated when the windshield wiper switch 30 is changed between an on position and an off position. The windshield wiper switch 30 outputs a signal to the ECU 3 which represents whether the windshield wiper switch 30 is in its on position or its off position, that is, whether the windshield wiper is activated or deactivated.

Figure 5:
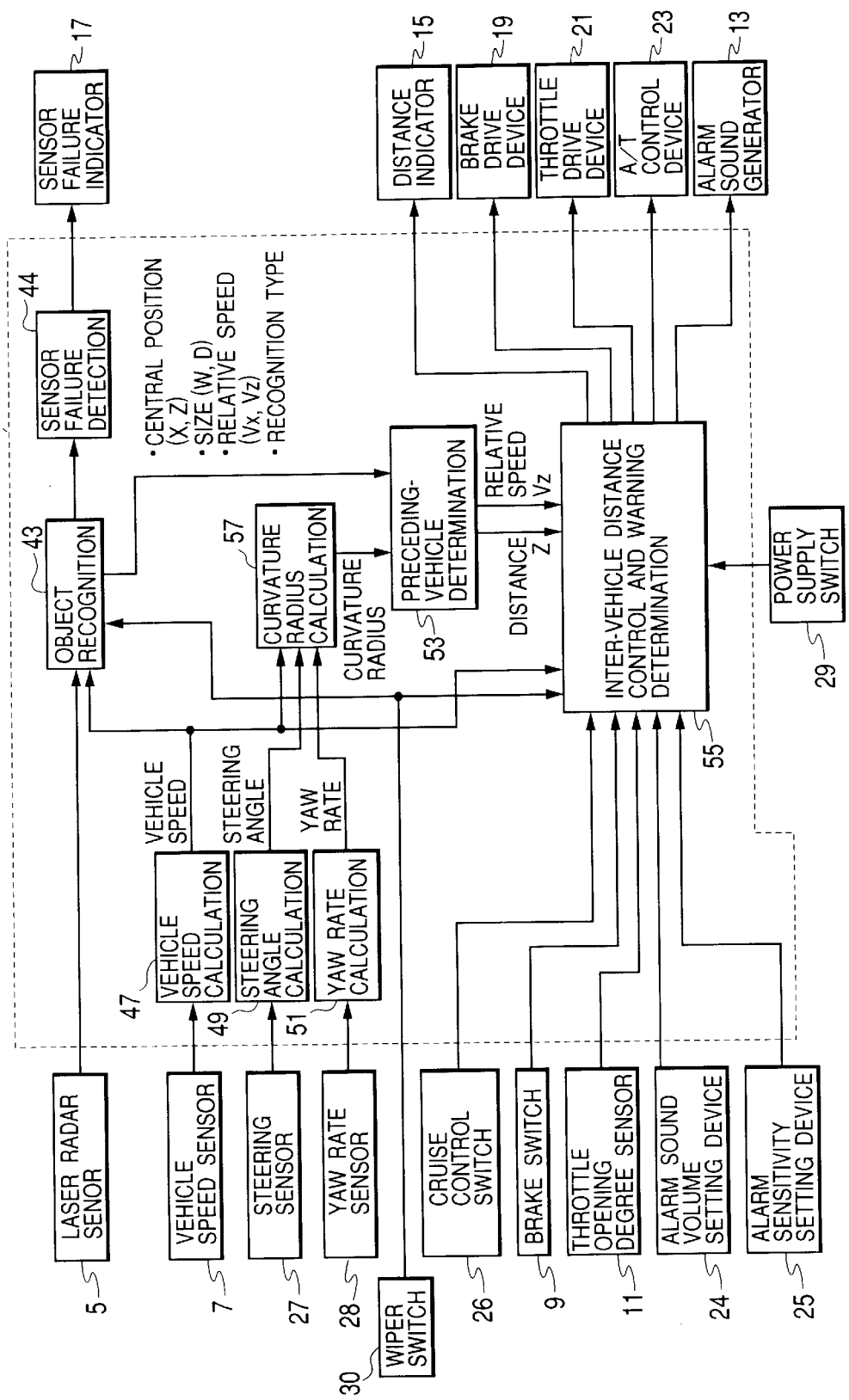
FIG. 5 is an operation flow diagram of an electronic control unit (ECU) in FIG. 1.

FIG. 5 shows the flow of operation of the ECU 3 rather than the hardware structure thereof. With reference to FIG. 5, an object recognition block 43 receives, from the CPU 70 in the laser radar sensor 5, measurement data representing a distance "r" and an angle "θ" concerning each detected object (each detected partial object or each detected point-like object part). The object recognition block 43 converts the distance and angle data of polar coordinates into measurement data of X-Z orthogonal coordinates designed so that the origin (0, 0) coincides with the center of a laser radar formed by the sensor 5, and the X axis and the Z axis coincide with a width-wise direction and a longitudinal forward direction of the present vehicle respectively. The object recognition block 43 groups detected partial objects (detected point-like object parts) represented by the orthogonal-coordinate measurement data into sets or segments corresponding to detected complete objects respectively. The grouping and the segments will be described later. Pieces of the grouping-resultant segment data which indicate respective segments are object-unit data pieces (per-object data pieces). A model of a complete object which is represented by central position data, size data, relative-speed data, and stationary-moving determination result data (recognition type data) will be called a target model.

A vehicle speed calculation block 47 computes the speed V of the present vehicle on the basis of the output signal from the vehicle speed sensor 7.

The object recognition block 43 calculates the central position (X, Z) and size (W, D) of each detected complete object on the basis of the grouping-resultant segment data. Here, W denotes a transverse width, and D denotes a depth. The object recognition block 43 calculates the speed (Vx, Vz) of the complete object relative to the present vehicle from a time-domain variation in the central position (X, Z) thereof. The object recognition block 43 is informed of the speed V of the present vehicle by the vehicle speed calculation block 47. The object recognition block 43 determines whether or not each detected complete object is stationary or moving on the basis of the vehicle speed V and the relative speed (Vx, Vz). The object recognition block 43 informs a preceding-vehicle determination block 53 of the central position, the size, the relative speed, and the recognition type (the stationary-moving determination result) of each detected complete object.

The measurement data fed to the object recognition block 43 from the CPU 70 in the laser radar sensor 5 also represent an echo intensity (an echo pulse width) concerning each detected object (each detected partial object or each detected point-like object part). The object recognition block 43 corrects or revises the segment data in response to the echo intensities (the echo pulse widths) through a data separation process for removing scatter-caused data components or scatter-caused data portions.

A sensor failure detection block 44 receives the output data (the object-recognition result data) from the object recognition block 43 which represent the object parameters calculated thereby. The sensor failure detection block 44 determines whether the output data from the object recognition block 43 are in a normal range or an abnormal range. When the output data from the object recognition block 43 are in the abnormal range, the sensor failure detection block 44 activates the sensor failure indicator 17 to indicate a failure.

A steering angle calculation block 49 computes the steering angle regarding the present vehicle on the basis of the output signal from the steering sensor 27. A yaw rate calculation block 51 computes the yaw rate of the present vehicle on the basis of the output signal from the yaw rate sensor 28.

A curvature-radius calculation block 57 is informed of the vehicle speed V by the vehicle speed calculation block 47. The curvature-radius calculation block 57 is informed of the computed steering angle by the steering angle calculation block 49. The curvature-radius calculation block 57 is informed of the computed yaw rate by the yaw rate calculation block 51. On the basis of the vehicle speed V, the steering angle, and the yaw rate, the curvature-radius calculation block 57 computes the radius R of curvature of the road along which the present vehicle is traveling. The curvature-radius calculation block 57 informs the preceding-vehicle determination block 53 of the computed curvature radius R.

The preceding-vehicle determination block 53 selects an objective preceding vehicle among the detected complete objects on the basis of the central positions, the sizes, the relative speeds, and the recognition types thereof, and on the basis of the curvature radius R. The preceding-vehicle determination block 53 gets information of the distance Z to the objective preceding vehicle and also information of the relative speed Vz of the objective preceding vehicle. The preceding-vehicle determination block 53 feeds an inter-vehicle distance control and warning determination block 55 with the information of the distance Z to the objective preceding vehicle and the information of the relative speed Vz of the objective preceding vehicle.

The inter-vehicle distance control and warning determination block 55 is informed of the vehicle speed V by the vehicle speed calculation block 47. The inter-vehicle distance control and warning determination block 55 detects setting conditions of the cruise control switch 26 from the output signal thereof. The inter-vehicle distance control and warning determination block 55 detects the state of the brake switch 9 from the output signal thereof. The state of the brake switch 9 represents whether or not the vehicle brake pedal is depressed. The inter-vehicle distance control and warning determination block 55 is informed of the degree of opening through the engine throttle valve by the throttle opening degree sensor 11. The inter-vehicle distance control and warning determination block 55 is informed of the alarm volume setting value by the alarm sound volume setting device 24. The inter-vehicle distance control and warning determination block 55 is informed of the alarm sensitivity setting value by the alarm sensitivity setting device 25. The inter-vehicle distance control and warning determination block 55 implements a warning determination and a cruise determination in response to the distance Z to the objective preceding vehicle, the relative speed Vz of the objective preceding vehicle, the vehicle speed V, the setting conditions of the cruise control switch 26, the state of the brake switch 9, the throttle opening degree, and the alarm sensitivity setting value. During the warning determination, the inter-vehicle distance control and warning determination block 55 determines whether or not an alarm should be generated. During the cruise determination, the inter-vehicle distance control and warning determination block 55 determines the contents of vehicle speed control. When it is determined that an alarm should be generated, the inter-vehicle distance control and warning determination block 55 outputs an alarm generation signal to the alarm sound generator 13. In this case, the alarm sound generator 13 produces alarm sound. The inter-vehicle distance control and warning determination block 55 adjusts the level of the alarm sound in accordance with the sound volume set by the alarm sound volume setting device 24. In the case where the cruise determination corresponds to the execution of cruise control, the inter-vehicle distance control and warning determination block 55 outputs suitable control signals to the automotive automatic transmission control device 23, the brake drive device 19, and the throttle drive device 21. During the execution of the warning control and the cruise control, the inter-vehicle distance control and warning determination block 55 outputs an indication signal to the distance indicator 15 to inform the vehicle's driver of distance-related conditions. For example, the device 15 indicates the distance Z to the objective preceding vehicle.

As shown in FIG. 5, the output signal of the windshield wiper switch 30 is fed to the object recognition block 43 and the inter-vehicle distance control and warning determination block 55. The output signal of the windshield wiper switch 30 is used by the object recognition block 43 and the inter-vehicle distance control and warning determination block 55. The execution of the data separation process by the object recognition block 43 is selectively permitted and inhibited in response to the output signal of the windshield wiper switch 30.

Figure 6:
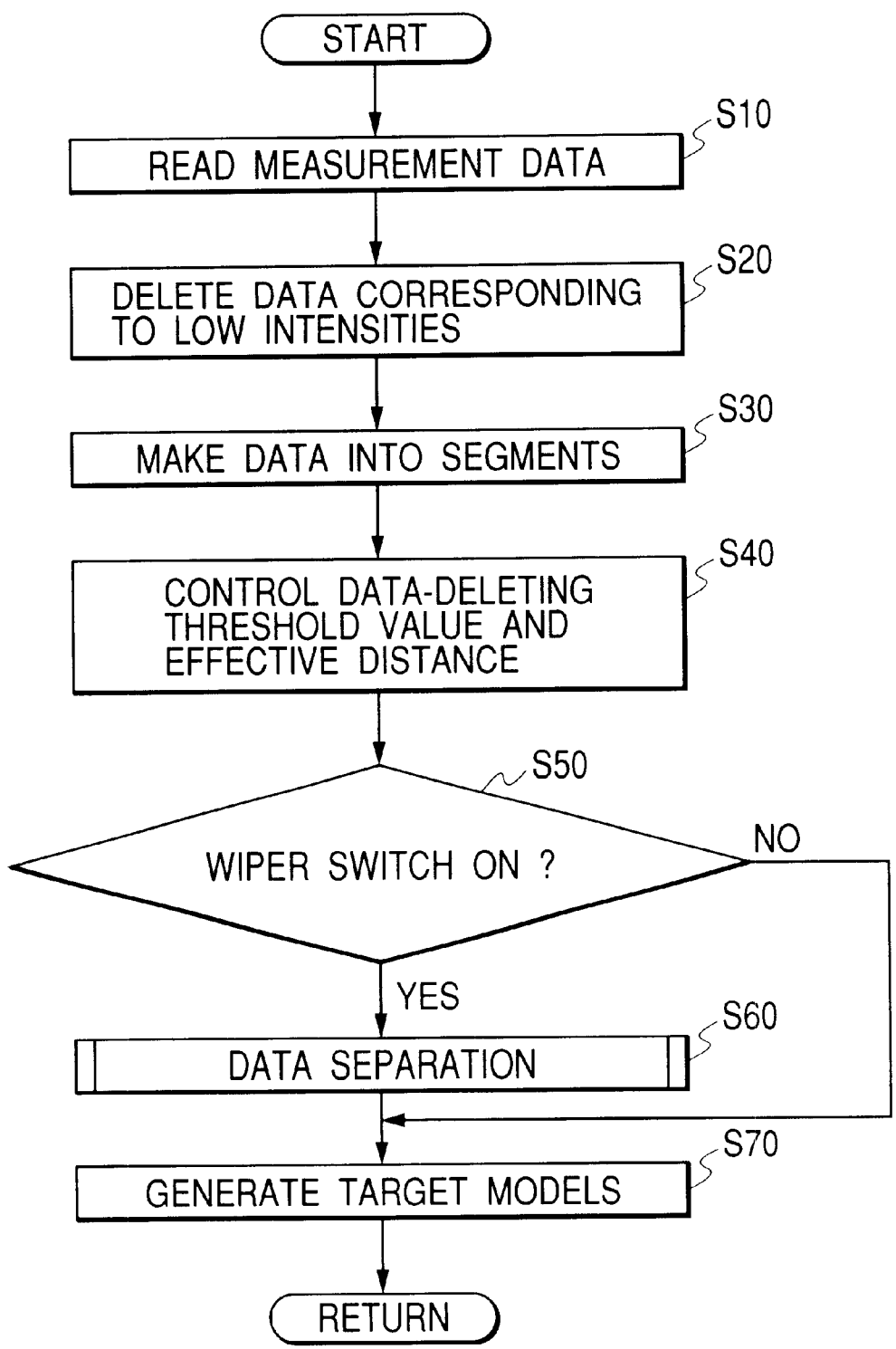
FIG. 6 is a flowchart of a portion of a program for the ECU in FIG. 1.

As previously mentioned, the ECU 3 operates in accordance with a program stored in its internal ROM or RAM. FIG. 6 is a flowchart of a portion of the program for the ECU 3 which relates to object recognition. The program portion in FIG. 6 is repetitively executed at a period corresponding to the period of the scanning implemented by the laser radar sensor 5.

As shown in FIG. 6, a first step S10 of the program portion receives distance and angle measurement data, and echo-pulse-width data (echo intensity data) from the laser radar sensor 5 for one period of the scanning. In other words, the step S10 receives distance and angle measurement data, and echo-pulse-width data (echo intensity data) corresponding to one frame. The scanning period is equal to, for example, 100 msec.

A step S20 following the step S10 deletes components from the distance and angle data which correspond to signal intensities (echo intensities or echo pulse widths) lower than a threshold value "A", and which correspond to distances shorter than an effective distance. The threshold value "A" and the effective distance are set by a step S40 (mentioned later) at the immediately-previous execution cycle of the program portion.

A step S30 subsequent to the step S20 processes the undeleted distance and angle data. Specifically, the step S30 converts the undeleted distance and angle data of polar coordinates into measurement data of X-Z orthogonal coordinates. The orthogonal-coordinate measurement data represent detected partial objects or detected point-like object parts. The step S30 groups the detected point-like object parts (the detected partial objects) into segments corresponding to detected complete objects respectively.

Figure 7:
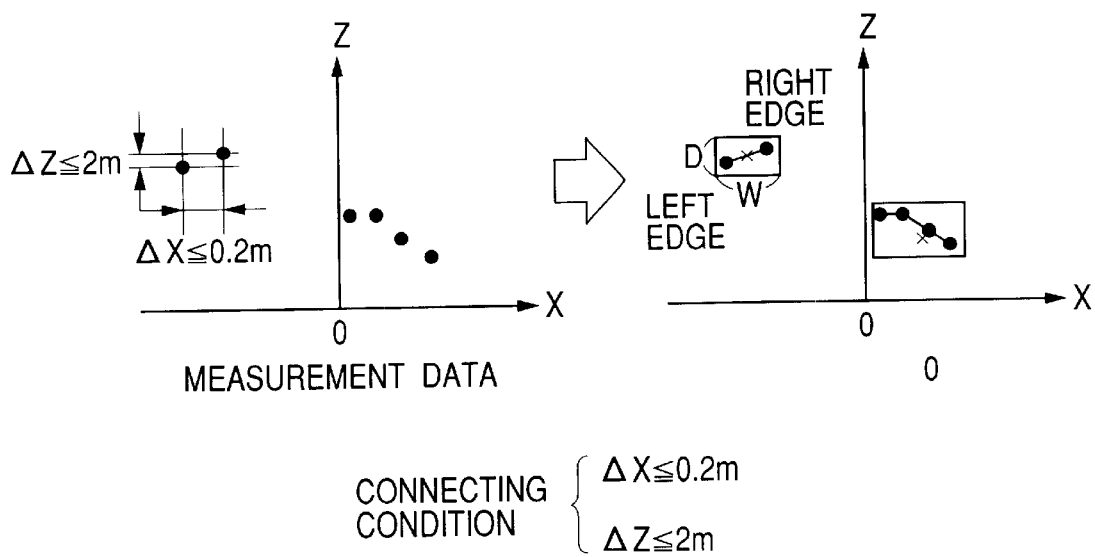
FIG. 7 is a diagram of an example of detected point-like object parts, and segments which result from unifying close ones of the detected point-like object parts.

With reference to FIG. 7, the step S30 searches the detected point-like object parts for close ones which are spaced by X-axis-direction distances ΔX of 0.2 m or less and Z-axis-direction distances ΔZ of 2 m or less. The step S30 combines or unifies the close point-like object parts into a segment (a set) corresponding to a detected complete object. There can be a plurality of segments. The step S30 generates data representing segments which are referred to as segment data. Specifically, one segment data piece (one data piece representing a segment) generated by the step S30 corresponds to a rectangular region having two sides parallel to the X axis and two sides parallel to the Z axis. One segment data piece contains an information piece indicating the central position of the related segment, an information piece indicating the size (W, D) of the segment, an information piece indicating the beam order number corresponding to the left-hand edge of the segment, and an information piece indicating the beam order number corresponding to the right-hand edge of the segment.

A step S40 following the step S30 controls the threshold value "A" and the effective distance for the step S20. The control-resultant threshold value "A" and the control-resultant effective distance are used by the step S20 at the next execution cycle of the program portion. In the case where segments represented by the data generated by the step S30 include a segment having a transverse width greater than a predetermined value (equal to, for example, 2.6 m), the step S40 increments the threshold value "A" for every scanning period until the transverse width of the segment of interest decreases below the predetermined value. The incremented threshold value "A" is used by the step S20 at the next execution cycle of the program portion. Preferably, the predetermined value is slightly greater than the maximum among the widths of ordinary trucks. The predetermined value is equal to, for example, 2.5 m. It is thought that a segment having a transverse width greater than the predetermined value is caused by the scatter of a laser beam which apparently increases an object image size.

Since signal intensities (echo intensities) are represented by pulse widths, the threshold value "A" controlled by the step S40 and used by the step S20 corresponds to one referred as a pulse-width threshold value. The details of the control of the threshold value "A" and the effective distance by the step S40 are as follows.

① In the case where segments represented by the data generated by the step S30 include a segment having a transverse width greater than 2.6 m and having a mean pulse width greater than the pulse-width threshold value, the step S40 increments the pulse-width threshold value by 1 LSB (corresponding to 6.4 nsec).

The pulse-width threshold value is variable only in the range of 10 to 20 LSB's. In addition, the step S40 sets the effective distance equal to the distance to the segment of interest plus 5 m.

② In the case where a segment having a transverse width greater than 2.6 m and having a mean pulse width greater than the pulse-width threshold value is absent from segments represented by the data generated by the step S30, the step S40 decrements the pulse-width threshold value by 1 LSB. In addition, the step S40 sets the effective distance equal to the distance to the segment of interest minus −0.5 m. The lower limit of the effective distance is equal to 35 m.

③ In the case where segments represented by the data generated by the step S30 include a segment located at a distance shorter than the distance of a segment satisfying the previously-mentioned conditions ①, and where the shorter-distance segment has a mean pulse width smaller than the pulse-width threshold value and has a straight-road conversion-resultant X coordinate whose absolute value is smaller than 1.0 m, the step S40 sets the pulse-width threshold value to a predetermined initial value (equal to, for example, 10 LSB's). In addition, the step S40 sets the effective distance to a predetermined initial value (equal to, for example, 35 m).

Figure 8:
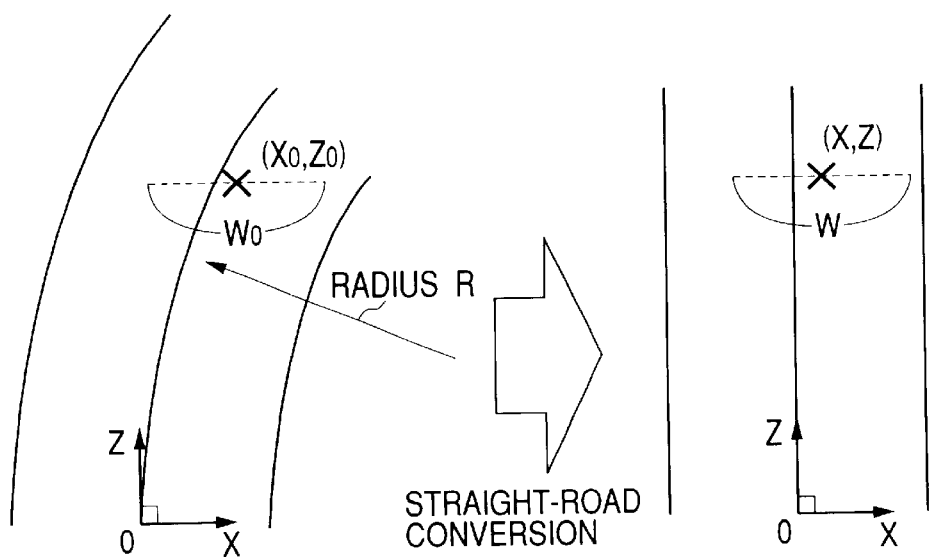
FIG. 8 is a diagram of conversion of coordinates.

The above-mentioned conditions ② prevent the step S20 from deleting preceding-vehicle-corresponding components of the distance and angle data. The straight-road conversion-resultant X coordinate will be explained below. Specifically, as shown in FIG. 8, the step S40 converts the coordinates (Xo, Zo) of the central position and the transverse width Wo of each complete object (each target model) into the coordinates (X, Z) and the transverse width W thereof which occur on the assumption that the present vehicle is traveling along a straight road. In more detail, the step S40 converts the coordinate values Xo and Zo and the transverse width Wo into the coordinate values X and Z and the transverse width W according to the following equations.

$$X = Xo - (Zo^2/2R) \quad (1)$$

$$Z = Zo \quad (2)$$

$$W = Wo \quad (3)$$

where R denotes the road curvature radius. The sign of the road curvature radius R is positive for a right-hand curve, and is negative for a left-hand curve. The equations (1), (2), and (3) are made on the basis of approximation using the assumption that the absolute value of the coordinate value Xo is significantly smaller than the road curvature radius R and the coordinate value Zo ($|Xo| << |R|$ and $|Xo| << Z$). In the case where the laser radar sensor 5 is significantly distant from the center of the body of the present vehicle, the X-Z coordinate system is corrected so that the origin thereof will coincide with the vehicle center.

Figure 9:
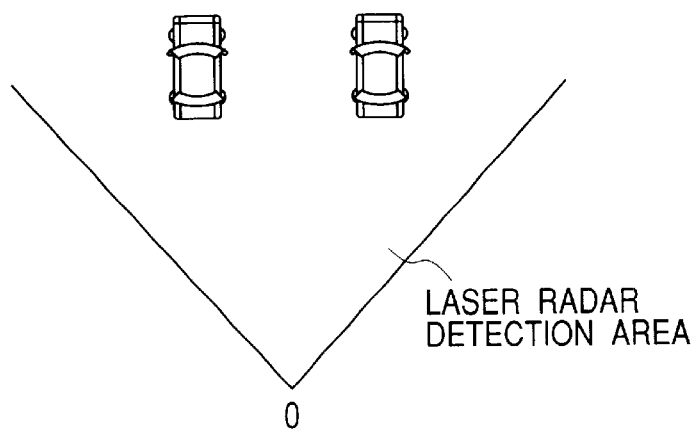
FIG. 9 is a diagram of a detection area scanned by the laser radar sensor in FIG. 1, and preceding vehicles in the detection area.
Figure 10:
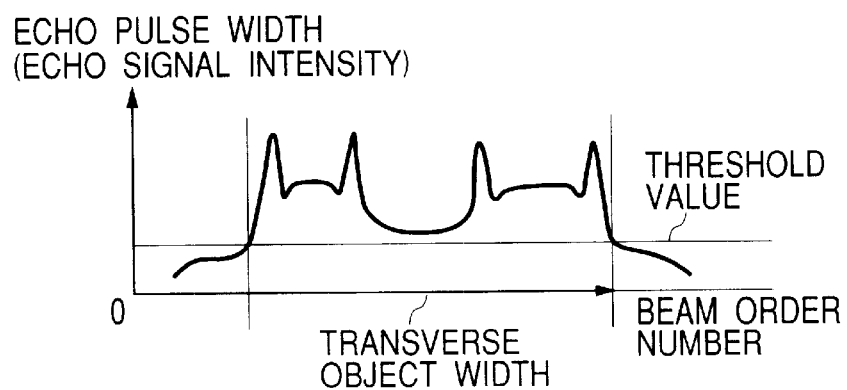
FIG. 10 is a diagram of an excessively low threshold value, and a first example of the relation between an echo pulse width and a beam order number.
Figure 11:
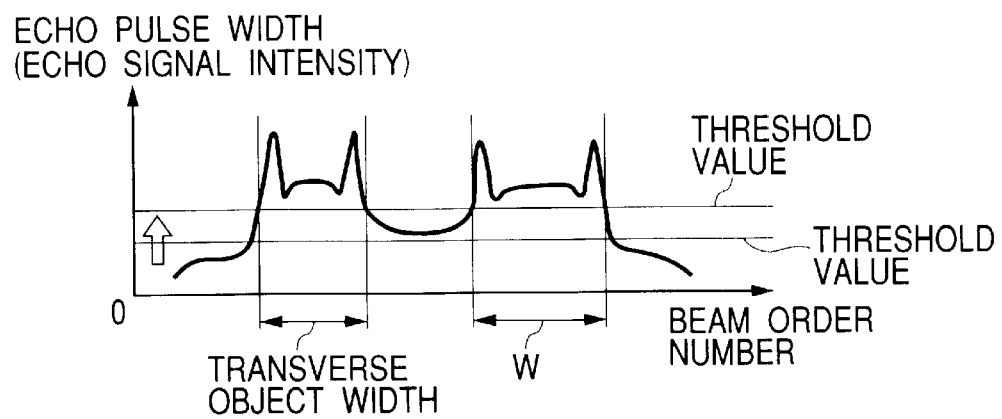
FIG. 11 is a diagram of the excessively low threshold value and a proper threshold value, and the first example of the relation between the echo pulse width and the beam order number.

The control of the threshold value "A" and the effective distance by the step S40 provides an advantage as follows. It is assumed that as shown in FIG. 9, two abreast vehicles located ahead of the present vehicle exist in the detection area monitored by the laser radar sensor 5. In this case, as shown in FIG. 10, the echo intensity (the echo pulse width) varies in accordance with the beam order number. There are four peaks in the echo intensity which correspond to the four reflectors of the two preceding vehicles. There is a valley in the echo intensity between the second leftmost peak and the second rightmost peak. When the threshold value "A" is lower than the valley between the second leftmost peak and the second rightmost peak as shown in FIG. 10, the two preceding vehicles are recognized as a single object having a transverse width slightly greater than the length between the leftmost peak and the rightmost peak. The transverse width of the recognized object is equal to the sum of the transverse widths of the two preceding vehicles and the transverse spacing therebetween. Therefore, the transverse width of the recognized object is greater than 2.6 m. Thus, the previously-mentioned conditions ① occur. As a result, the threshold value "A" is periodically incremented on a stepwise basis until the transverse width of a recognized object or the transverse widths of recognized objects decrease below 2.6 m. During this stage, when the threshold value "A" is greater than the valley between the second leftmost peak and the second rightmost peak, the two preceding vehicles are recognized as two separate objects. When the threshold value "A" is increased to a suitable value as shown in FIG. 11, the transverse widths of the two recognized objects are smaller than 2.6 m.

With reference back to FIG. 6, a step S50 follows the step S40.

The step S50 refers to the output signal of the windshield wiper switch 30, and thereby determines whether or not the switch 30 is in its on position. When the windshield wiper switch 30 is in its on position, the program advances from the step S50 to a data separation block (an anti-scatter block) S60. Otherwise, the program jumps from the step S50 to a step S70.

The data separation block S60 implements signal processing for data separation corresponding to anti-scatter. The data separation block S60 processes the segment data pieces provided by the step S30 into processing-resultant segment data pieces. After the data separation block S60, the program advances to the step S70.

The step S70 generates target models from the segment data pieces provided by the step S30 or the data separation block S60. After the step S70, the current execution cycle of the program portion ends.

Signal processing implemented by the data separation block S60 is as follows. The data separation block S60 separates the 1-frame echo signal into components caused by scattered forward laser beams and components caused by unscattered forward laser beams in response to a variation in the intensity of the echo signal along the width-wise direction of the present vehicle. Generally, a scattered forward laser beam occurs when an original forward laser beam travels through a lens-like shape of water on the glass plate 77 in the laser radar sensor 5. The data separation block S60 discards the scatter-caused signal components and enables only the scatter-unrelated signal components to be used in the object recognition (the target-model generation) by the step S70. Attention have been paid to the following two features A① and A②. A① The intensities of scatter-unrelated signal components are greater than those of scatter-caused signal components by a factor of more than 100 (that is, by two orders or more).

A② variation in the intensities of scatter-unrelated signal components along the width-wise direction of the present vehicle has a steep rising edge while that of scatter-caused signal components has a gentle rising edge.

The data separation block S60 implements a discrimination between scatter-unrelated signal components and scatter-caused signal components on the basis of the above-mentioned features A① and A② As previously mentioned, the width of a pulse in the output signal of the comparator 87 depends on the intensity of an echo laser beam (that is, the intensity of an echo signal). Specifically, the width of a pulse is approximately proportional to the logarithm of the intensity of an echo laser beam or an echo signal. Accordingly, it is possible to estimate the intensity of an echo laser beam or an echo signal from the width of a pulse. The data separation block S60 uses the pulse width as an indication of the echo intensity.

Figure 12:
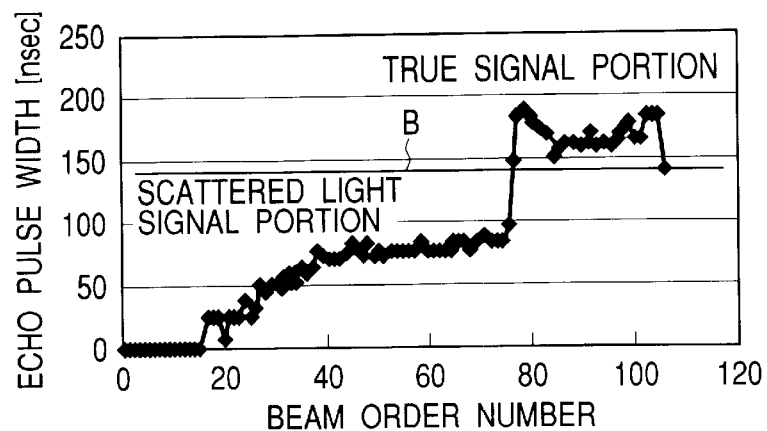
FIG. 12 is a diagram of a second example of the relation between the echo pulse width and the beam order number.

With reference to FIG. 12, the data separation block S60 refers to the 1-frame measurement data and thereby plots values of the echo pulse width as a function of the beam order number. In FIG. 12, the ordinate is assigned to the echo pulse width while the abscissa is assigned to the beam order number. A threshold value "B" is set equal to the maximum among the values of the echo pulse width minus a predetermined value. The threshold value "B" is indicated in FIG. 12 as a horizontal line. The graphic points in FIG. 12 which correspond to the respective values of the echo pulse width are connected by a line (referred to as a connection line). The data separation block S60 calculates the slope of the connection line at an intersection with the horizontal line of the threshold value "B". The data separation block S60 determines whether or not the calculated slope is steeper than a predetermined reference slope. In the case where the calculated slope is steeper than the predetermined reference slope, the data separation block S60 judges that portions of the measurement data which indicate echo pulse widths greater than the threshold value "B" are scatter-unrelated signal components, and portions of the measurement data which indicate echo pulse widths equal to or smaller than the threshold value "B" are scatter-caused signal components. In the case where the calculated slope is not steeper than the predetermined reference slope, the data separation block S60 basically judges all the measurement data to be scatter-caused signal components.

Figure 13:
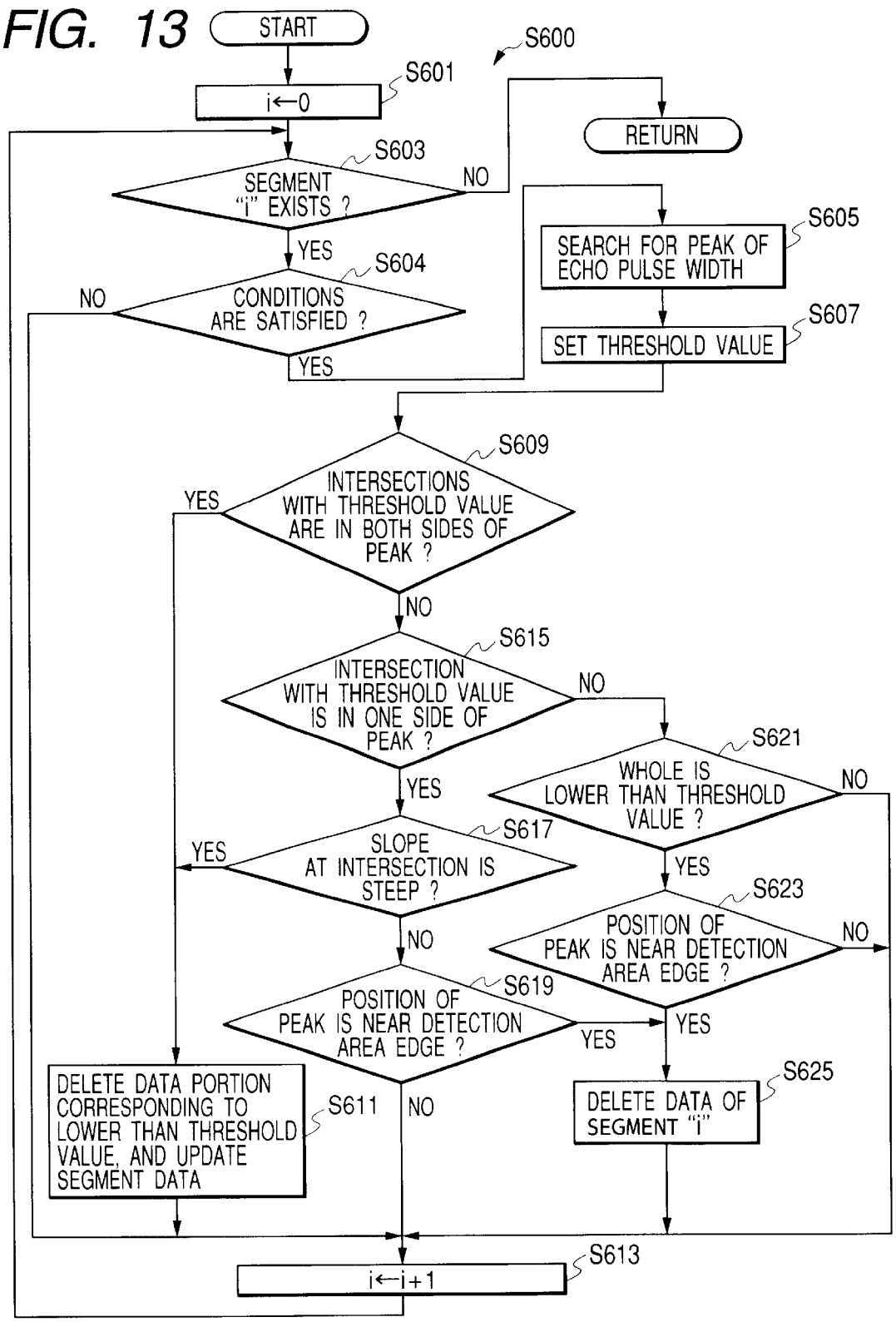
FIG. 13 is a flowchart of a block in FIG. 6.

FIG. 13 shows the details of the data separation block S60. As shown in FIG. 13, the data separation block S60 includes a step S601 which follows the step S50 (see FIG. 6). Serial identification numbers starting from "0" are assigned to segments respectively. A variable "i" indicates the segment identification number. A segment having an identification number "i" is also referred to as a segment "i". The step S601 sets the segment identification number "i" to "0". After the step S601, the program advances to a step S603.

The step S603 determines whether a segment "i" is present or absent. When the segment "i" is present, the program advances from the step S603 to a step S604. On the other hand, when the segment "i" is absent, the program advances from the step S603 to the step S70 (see FIG. 6).

The step S604 determines whether or not the segment "i" satisfies the following conditions B① and B②.

B① The transverse width W of the segment "i" is equal to or greater than 2.5 m, and the segment "i" originates from echo beams in 15 or more different angular directions.

B② The beam order number corresponding to the left-hand edge of the segment "i" is smaller than "10", or the beam order number corresponding to the right-hand edge of the segment "i" is equal to or greater than "95".

The above-mentioned conditions B① mean that the segment "i" is relatively great in transverse dimension. The above-mentioned conditions B② mean that a portion of the segment "i" is located at a left-hand or right-hand edge portion of the detection area. The left-hand edge potion corresponds to an angle of 1.5 degrees from the left-hand edge of the detection area. The right-hand edge potion corresponds to an angle of 1.5 degrees from the right-hand edge of the detection area.

When the segment "i" satisfies the above-mentioned conditions B① and B②, the program advances from the step S604 to a step S605. Otherwise, the program jumps from the step S604 to a step S613.

Figure 14:
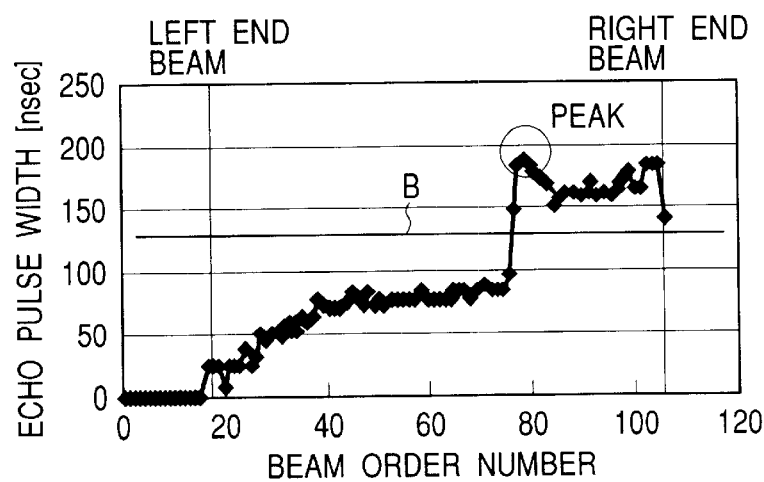
FIG. 14 is a diagram of the second example of the relation between the echo pulse width and the beam order number.

The step S605 investigates the echo pulse widths represented by a data portion corresponding to the range between the beam at the left-hand edge of the segment "i" and the beam at the right-hand edge of the segment "i", and searches the investigated echo pulse widths for a peak one or a maximum one (see FIG. 14).

A step S607 subsequent to the step S605 sets the threshold value "B" equal to the peak echo pulse width minus 64 nsec. A time interval of 64 nsec corresponds to 10 LSB's since a 1 LSB is equivalent to 6.4 nsec. The setting of the threshold value "B" is based on the fact that echo pulse widths of scatter-unrelated signal components are equal to or smaller than the peak echo pulse width by less than about 64 nsec. The step S607 defines 83.2 nsec (corresponding to 13 LSB's) as the lower limit of the threshold value "B".

A step S609 following the step S607 forms the connection line by connecting the graphic points (see FIGS. 12 and 14) which correspond to the respective echo pulse widths. The step S609 forms the horizontal line of the threshold value "B" (see FIGS. 12 and 14). The step S609 determines whether or not there are intersections between the connection line and the horizontal line of the threshold value "B" at two sides of the graphic point of the peak echo pulse width. When there are intersections, the program advances from the step S609 to a step S611. Otherwise, the program advances from the step S609 to a step S615.

Figure 15:
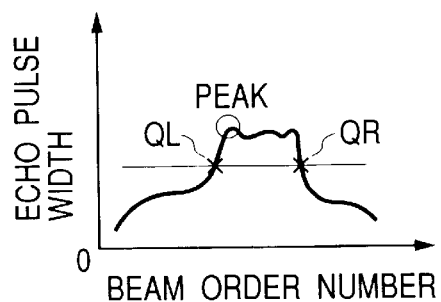
FIG. 15 is a diagram of a third example of the relation between the echo pulse width and the beam order number.
Figure 16:
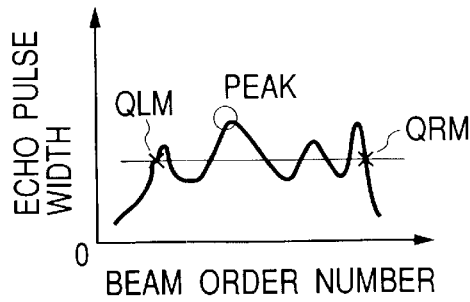
FIG. 16 is a diagram of a fourth example of the relation between the echo pulse width and the beam order number.

The step S611 processes the segment data corresponding to the segment "i". Specifically, the step S611 discards portions of the segment data which indicate echo pulse widths equal to or smaller than the threshold value "B". On the other hand, the step S611 leaves portions of the segment data which indicate echo pulse widths greater than the threshold value "B". FIG. 15 shows the case where there are only two intersections QL and QR at the left-hand and right-hand sides of the graphic point of the peak echo pulse width respectively. In this case, the step S611 leaves portions of the segment data which correspond to the range between the intersections QL and QR. The step S611 discards other portions of the segment data. Thus, the step S611 updates the segment data. FIG. 16 shows the case where there are a plurality of intersections at each of the left-hand and right-hand sides of the graphic point of the peak echo pulse width. In this case, the leftmost one QLM is selected from the intersections at the left-hand side of the graphic point of the peak echo pulse width. Also, the rightmost one QRM is selected from the intersections at the right-hand side of the graphic point of the peak echo pulse width. The step S611 leaves portions of the segment data which correspond to the range between the intersections QLM and QRM. The step S611 discards other portions of the segment data. Thus, the step S611 updates the segment data corresponding to the segment "i". After the step S611, the program advances to the step S613.

The step S611 implements a discrimination between scatter-unrelated signal components and scatter-caused signal components on the basis of the previously-mentioned feature A①. The step S611 leaves the scatter-unrelated signal components, and discards the scatter-caused signal components.

The step S615 determines whether or not there is an intersection between the connection line and the horizontal line of the threshold value "B" at only one side of the graphic point of the peak echo pulse width. When there is an intersection, the program advances from the step S615 to a step S617. Otherwise, the program advances from the step S615 to a step S621.

Figure 17:
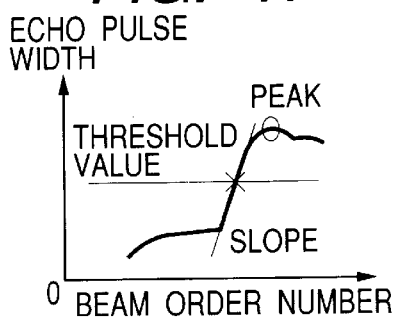
FIG. 17 is a diagram of a fifth example of the relation between the echo pulse width and the beam order number.
Figure 18:
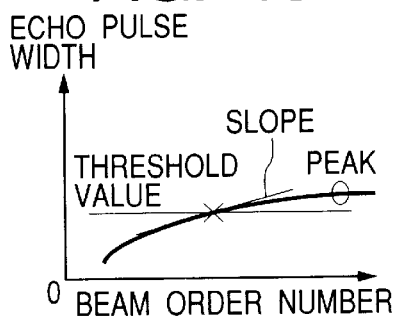
FIG. 18 is a diagram of a sixth example of the relation between the echo pulse width and the beam order number.
Figure 19:
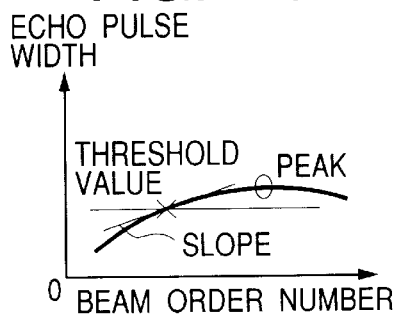
FIG. 19 is a diagram of a seventh example of the relation between the echo pulse width and the beam order number.

The step S617 calculates the slope of the connection line at the intersection with the horizontal line of the threshold value "B". The step S617 determines whether or not the calculated slope is steeper than a predetermined reference slope. When the calculated slope is steeper than the predetermined reference slope as shown in FIG. 17, the program advances from the step S617 to the step S611. In this case, the step S611 discards portions of the segment data which indicate echo pulse widths equal to or smaller than the threshold value "B", and leaves portions of the segment data which indicate echo pulse widths greater than the threshold value "B". Thus, the step S611 updates the segment data. On the other hand, when the calculated slope is not steeper than the predetermined reference slope as shown in FIGS. 18 and 19, the program advances from the step S617 to a step S619.

Figure 20:
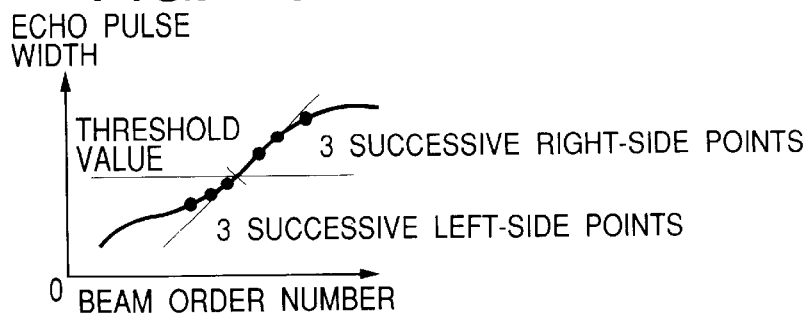
FIG. 20 is a diagram of an eighth example of the relation between the echo pulse width and the beam order number.

The step S617 implements the slope calculation as follows. With reference to FIG. 20, among all the graphic points of the echo pulse widths, the step S617 selects three successive graphic points at the left-hand side of the intersection and three successive graphic points at the right-hand side of the intersection. The step S617 may select only one or two successive graphic points at each of the left-hand and right-hand sides of the intersection when a complete set of three successive graphic points is unavailable. As shown in FIG. 20, the step S617 calculates a straight line approximate to the set of selected at most six graphic points according to a least-squares method. The step S617 calculates the slope of the straight line as an indication of the slope of the connection line at the intersection.

The predetermined reference slope used by the step S617 corresponds to 12.8 nsec per beam. The total number of the echo beams corresponding to the selected graphic points is calculated by referring to the beam order numbers. The difference between the maximum and the minimum among the related echo pulse widths is divided by the calculated total number of the echo beams. The result of this division is a slope equal to a change in the echo pulse width per beam.

When there are two or more intersections at only one side of the graphic point of the peak echo pulse width, the step S617 selects one from the intersections which is the farthest from the graphic point of the peak echo pulse width. The step S617 implements the previously-mentioned processing for only the selected intersection.

The step S619 determines whether or not the beam order number corresponding to the peak echo pulse width is in a predetermined range representative of a portion of the detection area sufficiently distant from its boundaries (edges). The lower limit of the predetermined range is equal to a beam order number of "20". The upper limit of the predetermined range is smaller than a beam order number of "85". In other words, the predetermined range "PR" is as "20≦PR<85". When the beam order number corresponding to the peak echo pulse width is in the predetermined range, that is, when the graphic point of the peak echo pulse width is sufficiently distant from the boundaries of the detection area, the program advances from the S619 to the step S613. In this case, all the segment data corresponding to the segment "i" remain as they are. On the other hand, when the beam order number corresponding to the peak echo pulse width is not in the predetermined range, that is, when the graphic point of the peak echo pulse width is near the boundaries of the detection area, the program advances from the S619 to a step S625.

When it is difficult for the step S617 to calculate the slope of the connection line at the intersection with the horizontal line of the threshold value "B", the program advances from the step S619 to the step S613 via the step S619. In this case, all the segment data corresponding to the segment "i" remain as they are. It should be noted that the step S617 can not calculate the slope when only one graphic point is selectable.

In the case where only one side of the graphical point has an intersection between the connection line and the horizontal line of the threshold value "B", it is unclear which of a scatter-unrelated signal portion and a scatter-caused signal portion the peak echo pulse width corresponds to. To provide a discrimination between a scatter-unrelated signal portion and a scatter-caused signal portion, the slope of the connection line at the intersection with the horizontal line of the threshold value "B" is calculated and used. When the calculated slope is steeper than the predetermined reference slope (see the step S617), it is determined that a scatter-unrelated signal portion exists. On the other hand, when th e calculated slope is not steeper than the predetermined reference slope, it is determined that a scatter-caused signal portion exists. A scatter-caused signal portion or portions are discarded while a scatter-unrelated signal portion or portions are left.

The conditions that the calculated slope is not steeper than the predetermined reference slope are also applied to the case where a gentle variation in the echo intensity exists in a central portion of the detection area. For example, when a preceding vehicle is very close to the present vehicle and the detection area is fully occupied by a reflector-free portion of the body of the preceding vehicle, there is only a gentle variation in the echo intensity.

In the case where the step S617 determines the calculated slope to be not steeper than the predetermined reference slope and the step S619 determines the graphic point of the peak echo pulse to be near the boundaries of the detection area, the program advances to the step S625. The step S625 deletes the segment data which corresponds to the segment "i". After the step S625, the program advances to the step S613.

Reflection of a scattered forward laser beam at an object outside the detection area may cause the following wrong recognition. A preceding vehicle on a lane adjacent to the lane along which the present vehicle is traveling is erroneously recognized as a preceding vehicle on the lane same as the present-vehicle's lane. The combination of the steps S617 and S619 detects such conditions. The step S625 deletes the segment data which corresponds to such conditions. Accordingly, the above-indicated wrong recognition is prevented.

Figure 21:
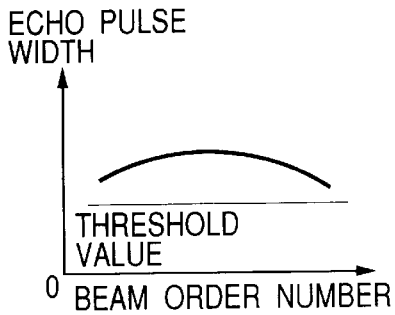
FIG. 21 is a diagram of a ninth example of the relation between the echo pulse width and the beam order number.
Figure 22:
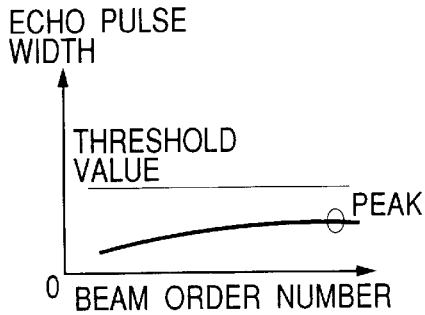
FIG. 22 is a diagram of a tenth example of the relation between the echo pulse width and the beam order number.
Figure 23:
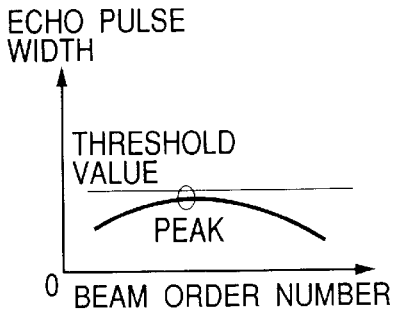
FIG. 23 is a diagram of an eleventh example of the relation between the echo pulse width and the beam order number.

The step S621 determines whether all the echo pulse widths are smaller or greater than the threshold value "B". When all the echo pulse widths are greater than the threshold value "B" as shown in FIG. 21, the program jumps from the step S621 to the step S613. In this case, all the segment data corresponding to the segment "i" remain as they are. On the other hand, when all the echo pulse widths are smaller than the threshold value "B" as shown in FIGS. 22 and 23, the program advances from the step S621 to a step S623.

The step S623 is similar to the step S619. The step S623 determines whether or not the beam order number corresponding to the peak echo pulse width is in the predetermined range representative of the portion of the detection area sufficiently distant from its boundaries (edges). As previously mentioned, the lower limit of the predetermined range is equal to a beam order number of "20". The upper limit of the predetermined range is smaller than a beam order number of "85". In other words, the predetermined range "PR" is as "20≦PR<85". When the beam order number corresponding to the peak echo pulse width is in the predetermined range, that is, when the graphic point of the peak echo pulse width is sufficiently distant from the boundaries of the detection area, the program advances from the S623 to the step S613. In this case, all the segment data corresponding to the segment "i" remain as they are. On the other hand, when the beam order number corresponding to the peak echo pulse width is not in the predetermined range, that is, when the graphic point of the peak echo pulse width is near the boundaries of the detection area, the program advances from the S619 to the step S625. In this case, the step S625 deletes the segment data which corresponds to the segment "i". After the step S625, the program advances to the step S613.

The combination of the steps S621, S623, and S625 prevent a wrong recognition caused by reflection of a scattered forward laser beam at an object outside the detection area.

The step S613 increments the segment identification number "i" by "1". After the step S613, the program returns to the step S603. Accordingly, signal processing about all the segments is executed.

The laser radar sensor 5 corresponds to radar means. The object recognition block 43 provided by the ECU 3 corresponds to recognizing means. The steps and the block in FIG. 6 correspond to the function of the recognizing means. The step S50 in FIG. 6 corresponds to the function of condition estimating means.

The vehicle control apparatus has advantages as mentioned below. With respect to measurement data representing objects detected by the laser radar sensor 5, it is possible to provide a suitable discrimination between scatter-caused signal components and scatter-unrelated signal components. Thus, it is possible to prevent the accuracy of the object recognition from being decreased by the difference between the actual shape of the cross section of the forward laser beam and the theoretical shape thereof which is used in the object recognition.

As shown in FIG. 6, the data separation block S60 is executed only when the step S50 determines the windshield wiper switch 30 to be in its on position. Therefore, an unnecessary anti-scattering process can be prevented from being executed. In addition, necessary signal portions for accurate object recognition can be prevented from being deleted by the unnecessary anti-scattering process.

The step S40 updates the threshold value "A" in response to the size of a recognized object. The step S20 in FIG. 6 implements deletion of components from the measurement data in response to the updating-resultant threshold value "A". Therefore, the object recognition can automatically follow actual conditions as mentioned below. When the threshold value "A" is lower than the valley between the second leftmost peak and the second rightmost peak as shown in FIG. 10, the two preceding vehicles are recognized as a single object having a transverse width greater than 2.6 m. As a result, the threshold value "A" is periodically incremented on a stepwise basis until the transverse width of a recognized object or the transverse widths of recognized objects decrease below 2.6 m. During this stage, when the threshold value "A" is greater than the valley between the second leftmost peak and the second rightmost peak, the two preceding vehicles are recognized as two separate objects. When the threshold value "A" is increased to a suitable value as shown in FIG. 11, the transverse widths of the two recognized objects are smaller than 2.6 m. Provided that the data separation block S60 is executed also, a vehicle having a width of 2 m can be recognized as an object having a width of 2 m. Even during the stage until the step S40 controls the threshold value "A" to a suitable value, an object width can be recognized and detected by the data separation block S60.

Second Embodiment

A second embodiment of this invention is similar to the first embodiment thereof except for design changes mentioned hereafter. The second embodiment of this invention implements data separation designed to compensate for the difference between the actual shape of the cross section of a forward laser beam and the theoretical shape thereof which is used in object recognition. Even in the absence of scatter, superfluous light exits in a peripheral portion of the forward laser beam. In the case of a millimeter wave beam, a peripheral portion of the beam is relatively large. The wave intensity of a peripheral portion of a beam is lower than that of an inner portion of the beam. The data separation implemented by the second embodiment of this invention is as follows. To provide a discrimination between echo signal components related to a peripheral portion of a beam and echo signal components related to an inner portion of the beam, an echo signal is processed in response to a reference intensity (a threshold intensity). Specifically, echo signal components having intensities equal to or higher than the reference intensity are selected and used as effective signal components for object recognition. On the other hand, echo signal components having intensities lower than the reference intensity are discarded. For example, the reference intensity is equal to a predetermined percentage of a peak intensity (a maximum intensity). The above-mentioned data separation is executed by a program block S150 indicated later.

Figure 24:
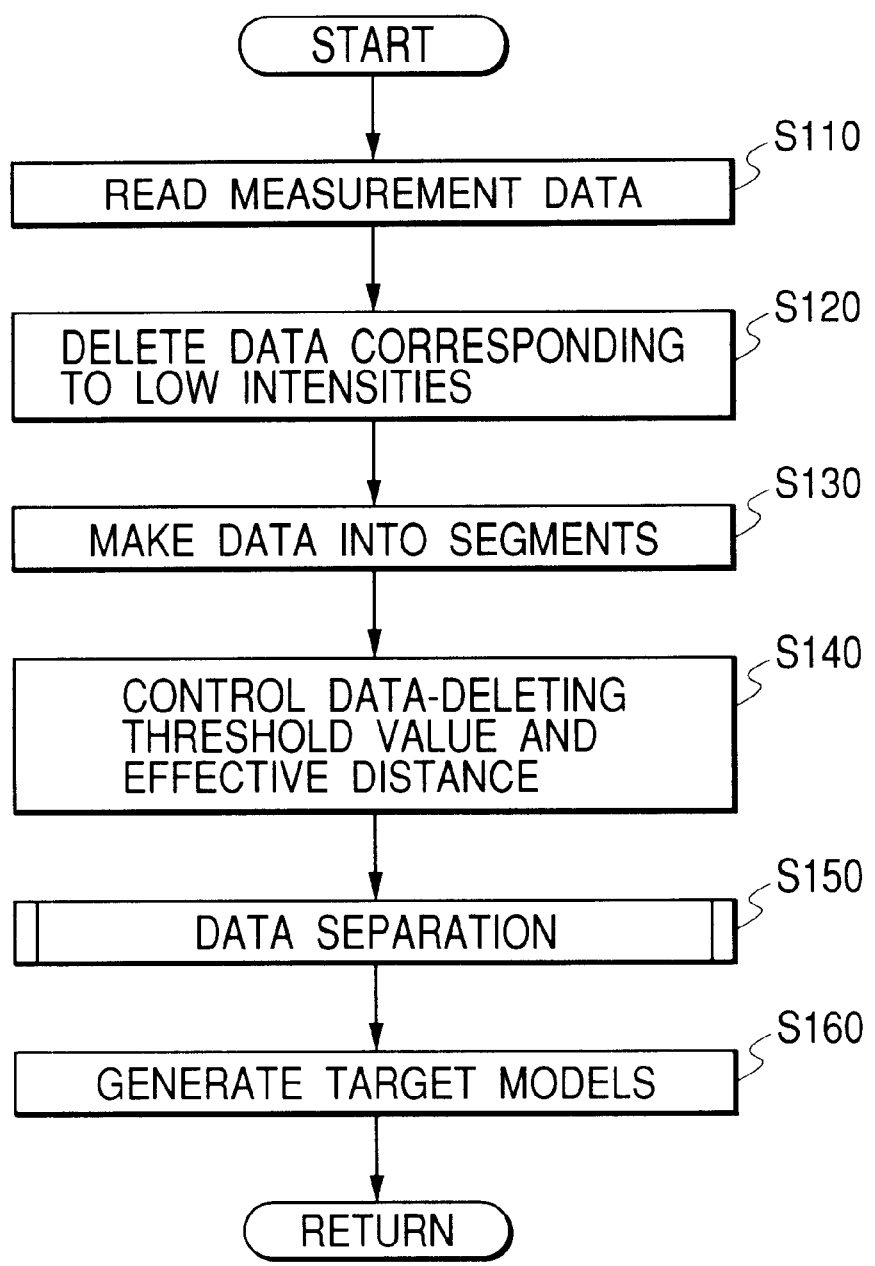
FIG. 24 is a flowchart of a portion of a program for an ECU in a second embodiment of this invention.

FIG. 24 is a flowchart of a portion of a program for an ECU 3 (see FIG. 1) which relates to object recognition in the second embodiment of this invention. The program portion in FIG. 24 is repetitively executed at a period corresponding to the period of the scanning implemented by a laser radar sensor 5 (see FIG. 1).

With reference to FIG. 24, a first step S110 of the program portion is similar to the step S10 in FIG. 6. A step S120 following the step S110 is similar to the step S20 in FIG. 6. A step S130 subsequent to the step S120 is similar to the step S30 in FIG. 6. A step S140 following the step S130 is similar to the step S40 in FIG. 6.

After the step S140, the program directly advances to a data separation block S150. The data separation block S150 corresponds to the data separation block S60 in FIG. 6. The data separation block S150 executes the previously-mentioned data separation in the second embodiment of this invention. After the data separation block S150, the program advances to a step S160. The step S160 is similar to the step S70 in FIG. 6. After the step S160, the current execution cycle of the program portion ends.

Third Embodiment

A third embodiment of this invention is similar to the first embodiment thereof except that a sensor for detecting a raindrop replaces the windshield wiper switch 30 (see FIG. 1). Generally, the raindrop sensor is mounted on the body of a vehicle. In the third embodiment of this invention, the step S50 (see FIG. 6) determines whether the output signal of the raindrop sensor indicates the presence or the absence of a raindrop. When the output signal of the raindrop sensor indicates the presence of a raindrop, the program advances from the step S50 to the data separation block S60 (see FIG. 6). On the other hand, when the output signal of the raindrop sensor indicates the absence of a raindrop, the program jumps from the step S50 to the step S70 (see FIG. 6).

What is claimed is:

1. A method of applying a transmission wave to a predetermined range in a width-wise direction of a subject vehicle, and recognizing objects located ahead of the subject vehicle on the basis of reflected waves which result from reflections of the transmission wave, the method comprising the steps of:

converting the reflected waves into a received signal;

detecting a variation in an intensity of the received signal along a direction corresponding to the width-wise direction of the subject vehicle;

separating the received signal into a first signal portion and a second signal portion on the basis of the detected signal intensity variation, the first signal portion corresponding to a scattered portion of the transmission wave, the second signal portion corresponding to an unscattered portion of the transmission wave; and recognizing objects on the basis of the second signal portion.

2. An object recognition apparatus comprising:
  laser radar means for applying a transmission wave to a predetermined range in a width-wise direction of a subject vehicle, converting reflected waves, which result from reflections of the transmission wave, into a received signal, and detecting objects on the basis of the received signal; and
  recognizing means for recognizing objects located ahead of the subject vehicle on the basis of results of detection by the laser radar means;
  wherein the recognizing means comprises:
    1) means for detecting a variation in an intensity of the received signal along a direction corresponding to the width-wise direction of the subject vehicle;
    2) means for separating the received signal into a first signal portion and a second signal portion on the basis of the detected signal intensity variation, the first signal portion corresponding to a scattered portion of the transmission wave, the second signal portion corresponding to an unscattered portion of the transmission wave; and
    3) means for recognizing objects on the basis of the second signal portion.

3. An object recognition apparatus as recited in claim 2, wherein the recognizing means comprises means for detecting the intensity of the received signal, and means for executing the separation of the received signal into the first signal portion and the second signal portion on the basis of the detected signal intensity.

4. An object recognition apparatus as recited in claim 3, wherein the recognizing means comprises means for setting a threshold value equal to a peak value of the detected signal intensity minus a predetermined value, means for determining whether or not the detected intensity of the received signal is lower than the threshold value, and means for executing the separation of the received signal into the first signal portion and the second signal portion in response to a result of determining whether or not the detected intensity of the received signal is lower than the threshold value.

5. An object recognition apparatus as recited in claim 2, wherein the recognizing means comprises means for calculating a rate of the detected signal intensity variation, and means for executing the separation of the received signal into the first signal portion and the second signal portion in response to the calculated intensity variation rate.

6. An object recognition apparatus as recited in claim 5, wherein the recognizing means comprises means for setting a threshold value with respect to the calculated intensity variation rate corresponding to a predetermined steep state, means for determining whether or not the intensity of the received signal is lower than the threshold value, and means for executing the separation of the received signal into the first signal portion and the second signal portion in response to a result of determining whether or not the intensity of the received signal is lower than the threshold value.

7. An object recognition apparatus as recited in claim 5, wherein the recognizing means comprises means for, when the calculated intensity variation rate corresponds to a predetermined gentle and monotonically-changing state, judging that a corresponding recognized object exists outside a predetermined recognition area.

8. An object recognition apparatus as recited in claim 5, wherein the recognizing means comprises means for, when the calculated intensity variation rate corresponds to a predetermined gentle and monotonically-changing state occurring in a prescribed vehicle width-wise direction position, judging that a corresponding recognized object exists outside a predetermined recognition area.

9. An object recognition apparatus as recited in claim 5, wherein the recognizing means comprises means for calculating a straight line approximate to the rate of the detected signal intensity variation in a least-squares method, means for calculating a slope of the straight line, and means for calculating the rate of the detected signal intensity variation from the calculated slope of the straight line.

10. An object recognition apparatus as recited in claim 2, wherein the recognizing means comprises means for setting a threshold value with respect to the intensity of the received signal, means for using the threshold value in the separation of the received signal into the first signal portion and the second signal portion, and means for changing the threshold value on the basis of a size of a recognized object.

11. An object recognition apparatus as recited in claim 10, wherein the recognizing means comprises means for continuing the changing of the threshold value until a length of the recognized object in the width-wise direction of the subject vehicle falls into a predetermined range.

12. An object recognition apparatus as recited in claim 2, wherein the received signal contains a pulse, and a time difference between a leading edge and a trailing edge of the pulse increases as the intensity of the received signal rises, and wherein the recognizing means comprises means for estimating the intensity of the received signal on the basis of the time difference between the leading edge and the trailing edge of the pulse.

13. An object recognition apparatus as recited in claim 2, wherein the recognizing means comprises condition estimating means for estimating whether or not there occurs a scatter condition that the transmission wave can be scattered, means for, only when the condition estimating means estimates that there occurs the scatter condition, executing the separation of the received signal into the first signal portion and the second signal portion.

14. An object recognition apparatus as recited in claim 13, wherein the scatter condition comprises a condition that a waterdrop can meet a member of the radar means through which the transmission wave travels.

15. An object recognition apparatus as recited in claim 14, wherein the condition estimating means comprises means for estimating whether or not there occurs the scatter condition on the basis of whether or not a windshield wiper of the subject vehicle is active.

16. A recording medium storing a program for controlling a computer operating as the recognizing means in the object recognition apparatus of claim 2.

17. A method of applying a transmission wave to a predetermined range in a width-wise direction of a subject vehicle, and recognizing objects located ahead of the subject vehicle on the basis of reflected waves which result from reflections of the transmission wave, the method comprising the steps of:
  converting the reflected waves into a received signal;
  wherein an intensity of a part of the transmission wave is maximized at a transmission center point, and is decreased as the part of the transmission wave becomes more distant from the transmission center point as viewed along the width-wise direction of the subject vehicle, and wherein a portion of the transmission wave which has an intensity equal to or higher than a prescribed intensity is effective for object recognition;
  detecting a rate of a variation in an intensity of the received signal along a direction corresponding to the width-wise direction of the subject vehicle;
  separating the received signal into a first signal portion and a second signal portion on the basis of the detected intensity variation rate, the first signal portion corresponding to the portion of the transmission wave which has the intensity equal to or higher than the prescribed intensity, the second signal portion corresponding to another portion of the transmission wave; and recognizing objects on the basis of the first signal portion.

18. A method of applying a transmission wave to a predetermined range in a width-wise direction of a subject vehicle, and recognizing objects located ahead of the subject vehicle on the basis of reflected waves which result from reflections of the transmission wave, the method comprising the steps of:

converting the reflected waves into a received signal;

wherein an intensity of a part of the transmission wave is maximized at a transmission center point, and is decreased as the part of the transmission wave becomes more distant from the transmission center point as viewed along the width-wise direction of the subject vehicle, and wherein a portion of the transmission wave which has an intensity equal to or higher than a prescribed intensity is effective for object recognition;

setting a threshold value with respect to an intensity of the received signal;

separating the received signal into a first signal portion and a second signal portion on the basis of the threshold value, the first signal portion corresponding to the portion of the transmission wave which has the intensity equal to or higher than the prescribed intensity, the second signal portion corresponding to another portion of the transmission wave;

recognizing objects on the basis of the first signal portion; and changing the threshold value until a length of a recognized object in the width-wise direction of the subject vehicle falls into a predetermined range.

19. An object recognition apparatus comprising:

laser radar means for applying a transmission wave to a predetermined range in a width-wise direction of a subject vehicle, converting reflected waves, which result from reflections of the transmission wave, into a received signal, and detecting objects on the basis of the received signal; and recognizing means for recognizing objects located ahead of the subject vehicle on the basis of results of detection by the laser radar means;

wherein an intensity of a part of the transmission wave is maximized at a transmission center point, and is decreased as the part of the transmission wave becomes more distant from the transmission center point as viewed along the width-wise direction of the subject vehicle, and wherein a portion of the transmission wave which has an intensity equal to or higher than a prescribed intensity is effective for object recognition;

wherein the recognizing means comprises:

1) means for detecting a rate of a variation in an intensity of the received signal along a direction corresponding to the width-wise direction of the subject vehicle;

2) means for separating the received signal into a first signal portion and a second signal portion on the basis of the detected intensity variation rate, the first signal portion corresponding to the portion of the transmission wave which has the intensity equal to or higher than the prescribed intensity, the second signal portion corresponding to another portion of the transmission wave; and 3) means for recognizing objects on the basis of the first signal portion.

20. An object recognition apparatus as recited in claim 19, wherein the recognizing means comprises means for setting a threshold value with respect to the calculated intensity variation rate corresponding to a predetermined steep state, means for determining whether or not the intensity of the received signal is lower than the threshold value, and means for executing the separation of the received signal into the first signal portion and the second signal portion in response to a result of determining whether or not the intensity of the received signal is lower than the threshold value.

21. An object recognition apparatus as recited in claim 19, wherein the recognizing means comprises means for, when the calculated intensity variation rate corresponds to a predetermined gentle and monotonically-changing state, judging that a corresponding recognized object exists outside a predetermined recognition area.

22. An object recognition apparatus as recited in claim 19, wherein the recognizing means comprises means for, when the calculated intensity variation rate corresponds to a predetermined gentle and monotonically-changing state occurring in a prescribed vehicle width-wise direction position, judging that a corresponding recognized object exists outside a predetermined recognition area.

23. An object recognition apparatus as recited in claim 19, wherein the recognizing means comprises means for calculating a straight line approximate to the rate of the detected signal intensity variation in a least-squares method, means for calculating a slope of the straight line, and means for calculating the rate of the detected signal intensity variation from the calculated slope of the straight line.

24. An object recognition apparatus comprising:

laser radar means for applying a transmission wave to a predetermined range in a width-wise direction of a subject vehicle, converting reflected waves, which result from reflections of the transmission wave, into a received signal, and detecting objects on the basis of the received signal; and recognizing means for recognizing objects located ahead of the subject vehicle on the basis of results of detection by the laser radar means;

wherein an intensity of a part of the transmission wave is maximized at a transmission center point, and is decreased as the part of the transmission wave becomes more distant from the transmission center point as viewed along the width-wise direction of the subject vehicle, and wherein a portion of the transmission wave which has an intensity equal to or higher than a prescribed intensity is effective for object recognition;

wherein the recognizing means comprises:

1) means for setting a threshold value with respect to an intensity of the received signal;

2) means for separating the received signal into a first signal portion and a second signal portion on the basis of the threshold value, the first signal portion corresponding to the portion of the transmission wave which has the intensity equal to or higher than the prescribed intensity, the second signal portion corresponding to another portion of the transmission wave;

3) means for recognizing objects on the basis of the first signal portion; and 4) means for changing the threshold value until a length of a recognized object in the width-wise direction of the subject vehicle falls into a predetermined range.

* * * * *